(12) United States Patent
Ishida et al.

(10) Patent No.: US 11,717,984 B2
(45) Date of Patent: *Aug. 8, 2023

(54) MANUFACTURING METHOD FOR THREE-DIMENSIONAL STRUCTURE AND MANUFACTURING APPARATUS THEREFOR

(71) Applicant: SEIKO EPSON CORPORATION, Tokyo (JP)

(72) Inventors: Masaya Ishida, Hara-mura (JP); Tomoyuki Kamakura, Matsumoto (JP); Takeshi Miyashita, Suwa (JP); Eiji Okamoto, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 111 days.

This patent is subject to a terminal disclaimer.

(21) Appl. No.: 17/109,646

(22) Filed: Dec. 2, 2020

(65) Prior Publication Data

US 2021/0086265 A1 Mar. 25, 2021

Related U.S. Application Data

(63) Continuation of application No. 15/341,616, filed on Nov. 2, 2016, now Pat. No. 10,894,289.

(30) Foreign Application Priority Data

Nov. 6, 2015 (JP) ................................ 2015-218515

(51) Int. Cl.
*B22F 12/00* (2021.01)
*B33Y 10/00* (2015.01)
(Continued)

(52) U.S. Cl.
CPC .............. *B33Y 10/00* (2014.12); *B22F 10/00* (2021.01); *B22F 10/16* (2021.01); *B22F 10/28* (2021.01);
(Continued)

(58) Field of Classification Search
CPC .. B22F 12/00; B22F 10/00; B22F 1/10; B22F 3/1021; B22F 10/10; B22F 2998/10;
(Continued)

(56) References Cited

U.S. PATENT DOCUMENTS 5,147,587 A    9/1992  Marcus
10,894,289 B2 *  1/2021  Ishida .................... B33Y 10/00
(Continued)

FOREIGN PATENT DOCUMENTS

CN    104149337    11/2014
JP    2015-081380 A    4/2015
(Continued)

*Primary Examiner* — Daniel C. McCracken
(74) *Attorney, Agent, or Firm* — Workman Nydegger

(57) ABSTRACT

A manufacturing method for three-dimensional structure has a layer forming step of supplying a flowable composition containing a powder and an organic material to form a unit layer, an organic material removing step of performing a treatment of removing the organic material on the unit layer, and an energy applying step of applying energy to the unit layer after the organic material removing step to form a molten layer or sintered layer, wherein the layer forming step, the organic material removing step, and the energy applying step are repeated with respect to the molten layer or sintered layer in a stacking direction as appropriate.

17 Claims, 16 Drawing Sheets

(51) Int. Cl.

| | | |
|---|---|---|
| *B28B 1/00* | (2006.01) | |
| *B22F 10/00* | (2021.01) | |
| *B33Y 30/00* | (2015.01) | |
| *B22F 3/10* | (2006.01) | |
| *B22F 10/10* | (2021.01) | |
| *B22F 1/10* | (2022.01) | |
| *B22F 10/16* | (2021.01) | |
| *B22F 10/28* | (2021.01) | |
| *B22F 12/13* | (2021.01) | |
| *B22F 10/43* | (2021.01) | |
| *B22F 10/32* | (2021.01) | |
| *B22F 12/41* | (2021.01) | |
| *B22F 12/47* | (2021.01) | |
| *B22F 12/53* | (2021.01) | |

(52) U.S. Cl.
CPC .............. *B22F 10/32* (2021.01); *B22F 10/43* (2021.01); *B22F 12/13* (2021.01); *B22F 12/22* (2021.01); *B28B 1/001* (2013.01); *B22F 1/10* (2022.01); *B22F 3/1021* (2013.01); *B22F 12/222* (2021.01); *B22F 12/224* (2021.01); *B22F 12/38* (2021.01); *B22F 12/41* (2021.01); *B22F 12/47* (2021.01); *B22F 12/53* (2021.01); *B22F 2998/10* (2013.01); *B22F 2999/00* (2013.01); *B33Y 30/00* (2014.12); *Y02P 10/25* (2015.11)

(58) Field of Classification Search
CPC .... B22F 2999/00; B22F 12/224; B22F 10/16; B22F 12/38; B22F 12/41; B22F 12/47; B22F 12/53; B22F 10/28; B22F 10/32; B22F 10/43; B22F 12/13; B22F 12/22; B22F 12/222; B22F 3/003; B28B 1/001; B33Y 10/00; B33Y 30/00; Y02P 10/25
See application file for complete search history.

(56) References Cited

U.S. PATENT DOCUMENTS

| | | |
|---|---|---|
| 2005/0003189 A1 | 1/2005 | Bredt et al. |
| 2006/0118532 A1 | 6/2006 | Chung |
| 2015/0104346 A1 | 4/2015 | Nakamura et al. |
| 2017/0014950 A1 | 1/2017 | Okada |
| 2017/0136545 A1 | 5/2017 | Yoshimura et al. |

FOREIGN PATENT DOCUMENTS

| | | |
|---|---|---|
| JP | 2015-096646 A | 5/2015 |
| WO | 2015/056230 | 4/2015 |
| WO | 2015/141032 | 9/2015 |
| WO | 2015/151839 | 10/2015 |

\* cited by examiner

MANUFACTURING METHOD FOR THREE-DIMENSIONAL STRUCTURE AND MANUFACTURING APPARATUS THEREFOR

CROSS-REFERENCE TO RELATED APPLICATIONS

This application is a continuation of U.S. patent application Ser. No. 15/341,616, filed Nov. 2, 2016, which claims priority to Japanese Patent Application No. 2015-218515, filed Nov. 6, 2015, the disclosures of which are incorporated by reference herein in their entirety.

BACKGROUND

1. Technical Field

The present invention relates to a manufacturing method for three-dimensional structure of manufacturing a three-dimensional structure and a manufacturing apparatus therefor.

2. Related Art

Patent Document 1 (JP-A-2015-81380) discloses examples of a manufacturing method for three-dimensional structure and a manufacturing apparatus therefor.

Patent Document 1 discloses that a material including metal particles with a binder attached to surfaces thereof is used, the binder is heated, molten, and vitrified by a heating device, and a solid powder layer is formed.

Patent Document 1 does not describe or suggest a problem that the binder containing an organic volatile component remains within the manufactured three-dimensional structure, i.e., a problem that the remaining binder is incorporated into the three-dimensional structure as an impurity and the characteristics and properties of the three-dimensional structure are deteriorated.

SUMMARY

An advantage of some aspects of the invention is to suppress reduction of purity due to a residual organic material within a three-dimensional structure and reduction of characteristics and properties of the three-dimensional structure.

A manufacturing method for three-dimensional structure according to a first aspect of the invention includes a layer forming step of supplying a flowable composition containing powder and an organic material to form a unit layer, an organic material removing step of performing a treatment of removing the organic material on the unit layer, and an energy applying step of applying energy to the unit layer after the organic material removing step to form a molten layer or sintered layer, wherein the layer forming step, the organic material removing step, and the energy applying step are repeated with respect to the molten layer or sintered layer in a stacking direction as appropriate.

Here, "powder" may be metal power or ceramics powder, or may be a mixture thereof. Further, the powder includes a mixture of a granular material in larger particle size and a powdery material in smaller particle size.

Further, "three-dimensional structure" includes not only a steric structure in which a plurality of unit layers having a predetermined thickness are stacked in a stacking direction but also a planar structure in which only one unit layer having a predetermined thickness is provided. Therefore, "repeated . . . in a stacking direction as appropriate" refers to repeated for manufacture of the steric structure and not repeated for manufacture of the planar structure.

Furthermore, "treatment of removing the organic material" is not limited to specific treatment as long as the organic material in the unit layer may be removed from the unit layer. That is, the treatment includes a treatment of removing the organic material by applying heat to the unit layer from at least one of the front surface side and the rear surface side, and a treatment by applying an air flow, making a reduced-pressure atmosphere, or a combination of these two or more treatments.

According to the aspect, the organic material removing step of performing the treatment of removing the organic material on the unit layer and the energy applying step of applying energy to the unit layer after the organic material removing step to form the molten layer or sintered layer are provided, and thereby, reduction in characteristics of the three-dimensional structure due to residual organic materials inside and on the surface of the three-dimensional structure may be suppressed.

The manufacturing method for three-dimensional structure according to a second aspect of the invention is directed to the first aspect, in which the organic material in the flowable composition is a solvent, and the organic material removing step has a step of gasifying the solvent for removal.

Here, "gasifying" of "gasifying the solvent" is not limited to gasifying by heating, but includes gasifying by reducing pressure and gasifying by heating under the reduced-pressure atmosphere.

Further, it is preferable to select the solvent from solvents having boiling points from about 70° C. to 300° C. In the case of the solvent having the boiling point equal to or lower than 70° C., a flowable composition is dried too easily and layer formation is difficult. In the case of the solvent having the boiling point higher than 300° C., energy necessary for gasification is excessive.

According to the aspect, the organic material removing step gasifies the solvent for removal. Therefore, the organic material contained in the flowable composition may be removed relatively easily. The method is especially effective for a highly volatile organic material.

The manufacturing method for three-dimensional structure according to a third aspect of the invention is directed to the first aspect, in which the organic material in the flowable composition contains a solvent and a binder, and the organic material removing step has a step of applying energy that can remove the binder for removal.

Here, "energy" applied to the binder includes not only thermal energy by a laser beam or infrared light but also electromagnetic wave energy including ultraviolet light. The applying means of infrared light includes a halogen heater and a carbon heater.

Further, "energy that can remove the binder" is determined by the kind of binder, and it is preferable to use a binder that decomposes at a temperature equal to or lower than 500° C. in view of avoidance of excessive energy application. In this manner, "energy that can remove the binder" is easily and specifically determined.

According to the aspect, the organic material removing step applies the energy that can remove the binder for removal. Therefore, even when the flowable composition contains a binder having higher boiling point than that of the solvent in addition to the solvent, the binder may be effectively removed.

Note that the method may be a method of performing the removal of the solvent in the unit layer as a preceding step and then performing the removal of the binder as a subsequent step or a method of performing the removal of the solvent and the removal of the binder at the same time.

The manufacturing method for three-dimensional structure according to a fourth aspect of the invention is directed to the manufacturing method for three-dimensional structure according to the third aspect, in which the energy that can remove the binder is applied at multiple stages, and the first applied energy is at a lower level than that of the subsequently applied energy.

According to the aspect, the energy that can remove the binder is applied at the multiple stages and the first applied energy is at the lower level than that of the subsequently applied energy, and thereby, the binder is removed gradually in a stepwise manner and the potential of the residual binder may be reduced.

The manufacturing method for three-dimensional structure according to a fifth aspect of the invention is directed to the third aspect, in which the organic material removing step and the energy applying step are executed by irradiating the same area of the unit layer with a laser beam at least twice and moving from a removing treatment of the organic material to a forming treatment of the molten layer or sintered layer in a stepwise manner.

According to the aspect, the same area of the unit layer is irradiated with the laser beam at least twice and the process moves from the removing treatment of the organic material to the forming treatment of the molten layer or sintered layer in the stepwise manner, and thereby, the removal of the solvent and the binder (organic material) contained in the flowable composition may be performed with the first applied low-level or medium-level energy and sintering or melting of the powder contained in the flowable composition may be performed with the subsequently applied high-level energy. Therefore, the organic material removing step and the energy applying step may be continuously performed by varying the output of the laser beam.

Further, "irradiating . . . with the laser beam at least twice" may be a treatment of applying high-level energy subsequent to medium-level energy application, not limited to a specific energy application condition. That is, "irradiating . . . with the laser beam at least twice" includes a treatment of, after medium-level energy application, instantaneously changing to high-level energy without turning off the laser or increasing to the higher level in a stepwise manner.

The manufacturing method for three-dimensional structure according to a sixth aspect of the invention is directed to any one of the first to fifth aspects, in which at least one of the organic material removing step and the energy applying step is performed under a reduced-pressure atmosphere.

According to the aspect, at least one of the organic material removing step and the energy applying step is performed under the reduced-pressure atmosphere, and thereby, the organic material can be dried and gasified for removal at the lower heating temperature, and thereby, the removal of the organic material is easier.

The manufacturing method for three-dimensional structure according to a seventh aspect of the invention is directed to any one of the first to sixth aspects, in which at least one of the organic material removing step and the energy applying step is performed under an inert gas atmosphere.

According to the aspect, at least one of the organic material removing step and the energy applying step is performed under the inert gas atmosphere, and thereby, the potential that the powder is oxidized and the components of oxygen etc. are incorporated into the three-dimensional structure can be reduced.

The manufacturing method for three-dimensional structure according to an eighth aspect of the invention is directed to any one of the first to seventh aspects, in which fume generated at the energy applying step is suctioned.

According to the aspect, the fume generated at the energy applying step may be removed by suctioning, and thereby, the potential that the organic material of carbon or the like contained in the fume attaches to the surface of the three-dimensional structure and is incorporated into the three-dimensional structure may be reduced.

The manufacturing method for three-dimensional structure according to a ninth aspect of the invention is directed to any one of the first to eighth aspects, in which the layer forming step is performed under a reduced-pressure atmosphere.

According to the aspect, the layer forming step is performed under the reduced-pressure atmosphere, and thereby, the organic material can be dried and gasified for removal at the lower temperature even in the formation of the unit layer.

The manufacturing method for three-dimensional structure according to a tenth aspect of the invention is directed to any one of the first to ninth aspects, in which the layer forming step and the organic material removing step are performed in different areas.

According to the aspect, the formation of the unit layer and the removal of the organic material are performed in different areas, and thereby, the potential of reattachment of the organic material that has been once removed to the surface of the unit layer may be reduced.

The manufacturing method for three-dimensional structure according to an eleventh aspect of the invention is directed to any one of the first to tenth aspects, in which the layer forming step has a first material layer forming step of forming a first material layer corresponding to a three-dimensional structure, and a supporting layer forming step of forming a supporting layer that supports the first material layer.

According to the aspect, the layer forming step has the first material layer forming step of forming the first material layer corresponding to the three-dimensional structure and the supporting layer forming step of forming the supporting layer that supports the first material layer, and thereby, the first material layer is held by the supporting layer and the method can handle various shapes of the three-dimensional structure.

The manufacturing method for three-dimensional structure according to a twelfth aspect of the invention is directed to the eleventh aspect, in which the first material layer includes at least one of magnesium, iron, copper, cobalt, titanium, chromium, nickel, maraging steel, stainless, cobalt-chromium-molybdenum, titanium alloy, nickel alloy, aluminum alloy, cobalt alloy, and cobalt-chromium alloy as powder.

According to the aspect, the amount of the residual organic material in the manufactured three-dimensional structure is reduced, and thereby, the purity of the three-dimensional structure using the metal powder can be improved.

The manufacturing method for three-dimensional structure according to a thirteenth aspect of the invention is directed to the eleventh or twelfth aspect, in which the supporting layer includes at least one of alumina and ceramics as powder.

According to the aspect, after the energy is applied to the first material layer and the molten layer or sintered layer is formed, the work of decomposing and removing the supporting layer is easier and the three-dimensional structure having the smaller amount of residual organic material and the higher purity may be efficiently manufactured.

A manufacturing apparatus for three-dimensional structure according to a fourteenth aspect of the invention includes a layer forming unit that supplies a flowable composition containing powder and an organic material to form a unit layer, an organic material removing unit that performs a treatment of removing the organic material on the unit layer, and an energy applying unit that applies energy to the unit layer after the treatment of removing the organic material is performed to form a molten layer or sintered layer.

According to the aspect, the same advantage as in the first aspect can be obtained.

The manufacturing apparatus for three-dimensional structure according to a fifteenth aspect of the invention is directed to the fourteenth aspect, in which a first chamber that houses the layer forming unit and a second chamber that houses the organic material removing unit are provided.

According to the aspect, the same advantage as in the tenth aspect can be obtained.

BRIEF DESCRIPTION OF THE DRAWINGS

The invention will be described with reference to the accompanying drawings, wherein like numbers reference like elements.

DESCRIPTION OF EXEMPLARY EMBODIMENTS

As below, a manufacturing method for three-dimensional structure and a manufacturing apparatus therefor according to embodiments of the invention will be explained in detail with reference to the accompanying drawings.

In the following explanation, first, the summary of the overall configuration of the manufacturing apparatus for three-dimensional structure according to the invention will be explained by taking a manufacturing apparatus for three-dimensional structure according to Embodiment 1 as an example. Then, a specific configuration of the manufacturing apparatus for three-dimensional structure according to Embodiment 1 will be explained, and subsequently, a manufacturing method for three-dimensional structure according to the invention executed using the manufacturing apparatus for three-dimensional structure according to Embodiment 1 will be specifically explained as Embodiment 2.

Then, the seven embodiments from Embodiment 3 to Embodiment 9 different from Embodiment 2 in partial configurations will be sequentially explained with focuses on differences from Embodiment 2.

Then, a configuration of a manufacturing apparatus for three-dimensional structure according to Embodiment 10 different from Embodiment 1 in partial configuration will be explained with a focus on differences from Embodiment 1.

Finally, another embodiment of a manufacturing method for three-dimensional structure and a manufacturing apparatus therefor according to the invention different from the respective embodiments from Embodiment 1 to Embodiment 9 in partial configurations will be mentioned.

Embodiment 1 (see FIGS. 1 to 5 and 6)

Figure 1:
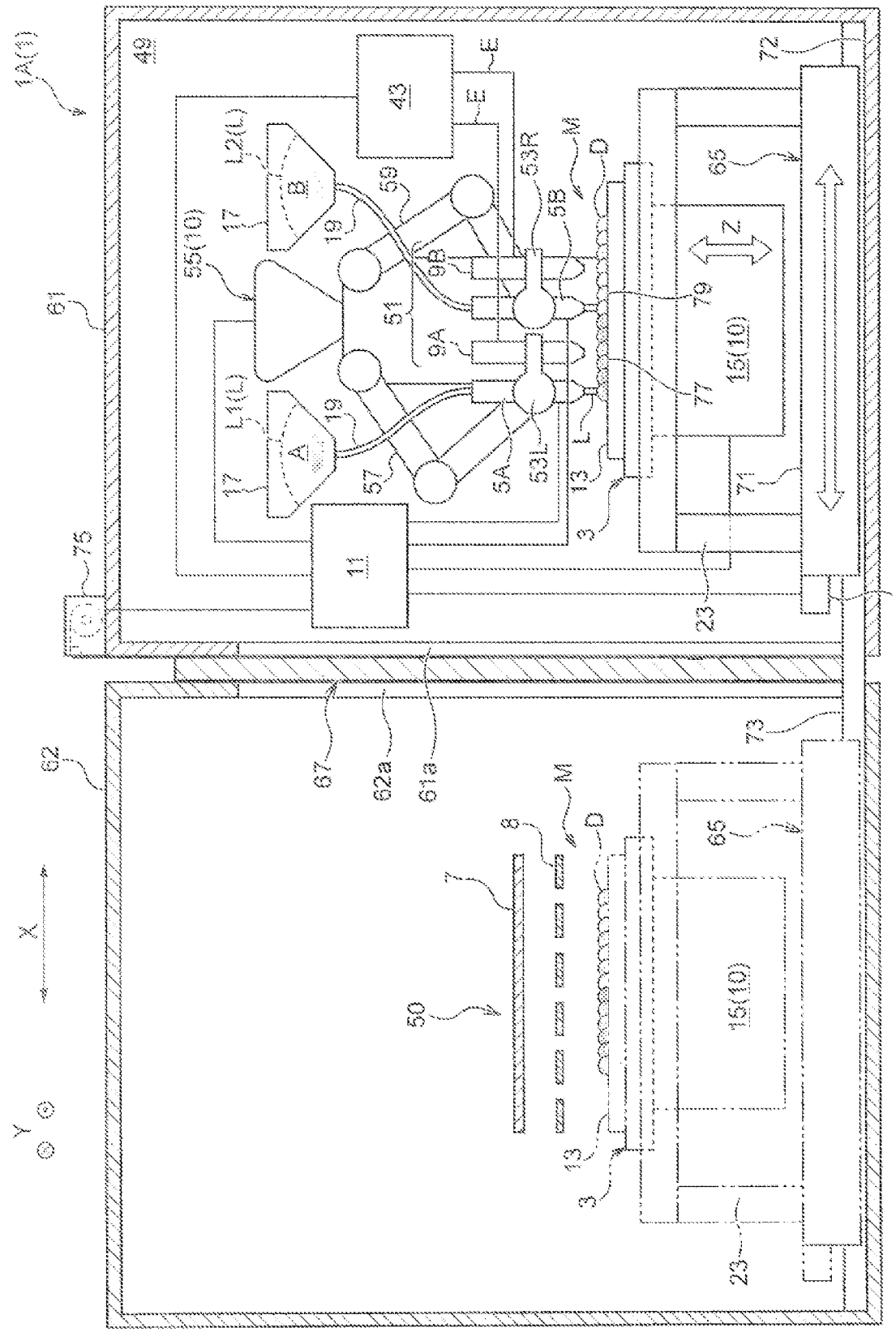
FIG. 1 is a front view schematically showing an overall configuration of a manufacturing apparatus for three-dimensional structure according to Embodiment 1 of the invention.
Figure 2:
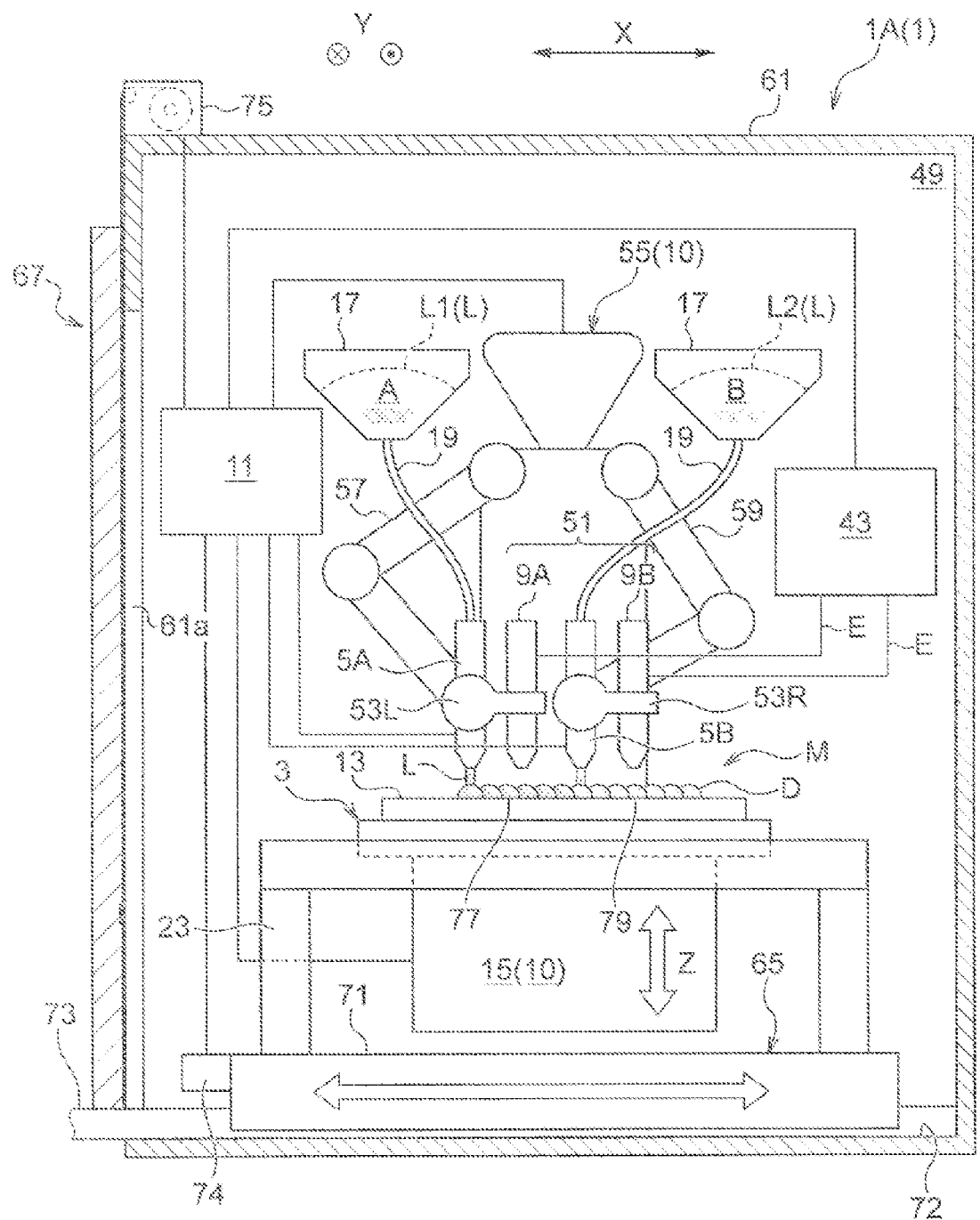
FIG. 2 is a front view showing inside of a first chamber of the manufacturing apparatus for three-dimensional structure according to Embodiment 1 of the invention.
Figure 3:
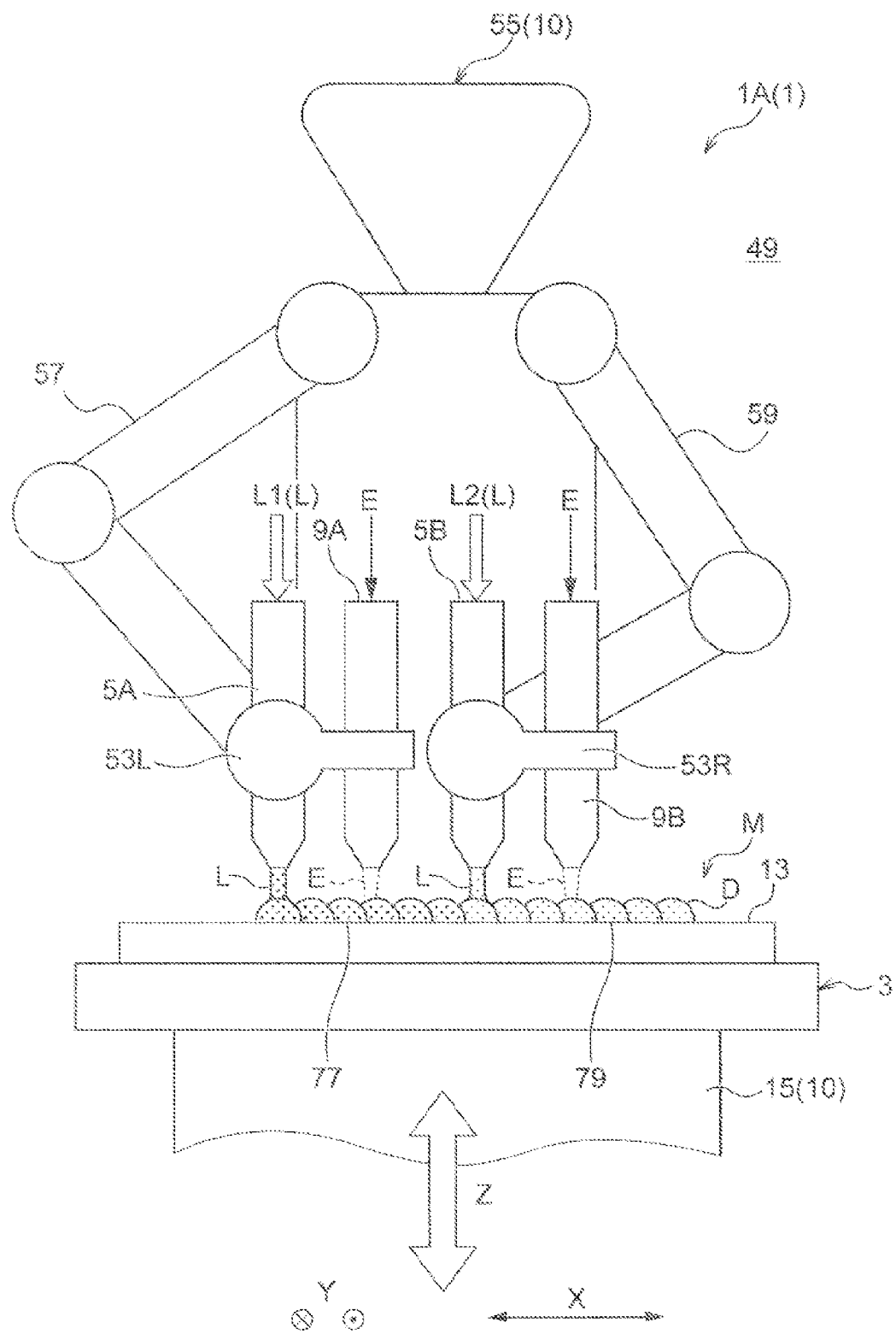
FIG. 3 is a front view showing a main part inside of the first chamber of the manufacturing apparatus for three-dimensional structure according to Embodiment 1 of the invention.
Figure 4:
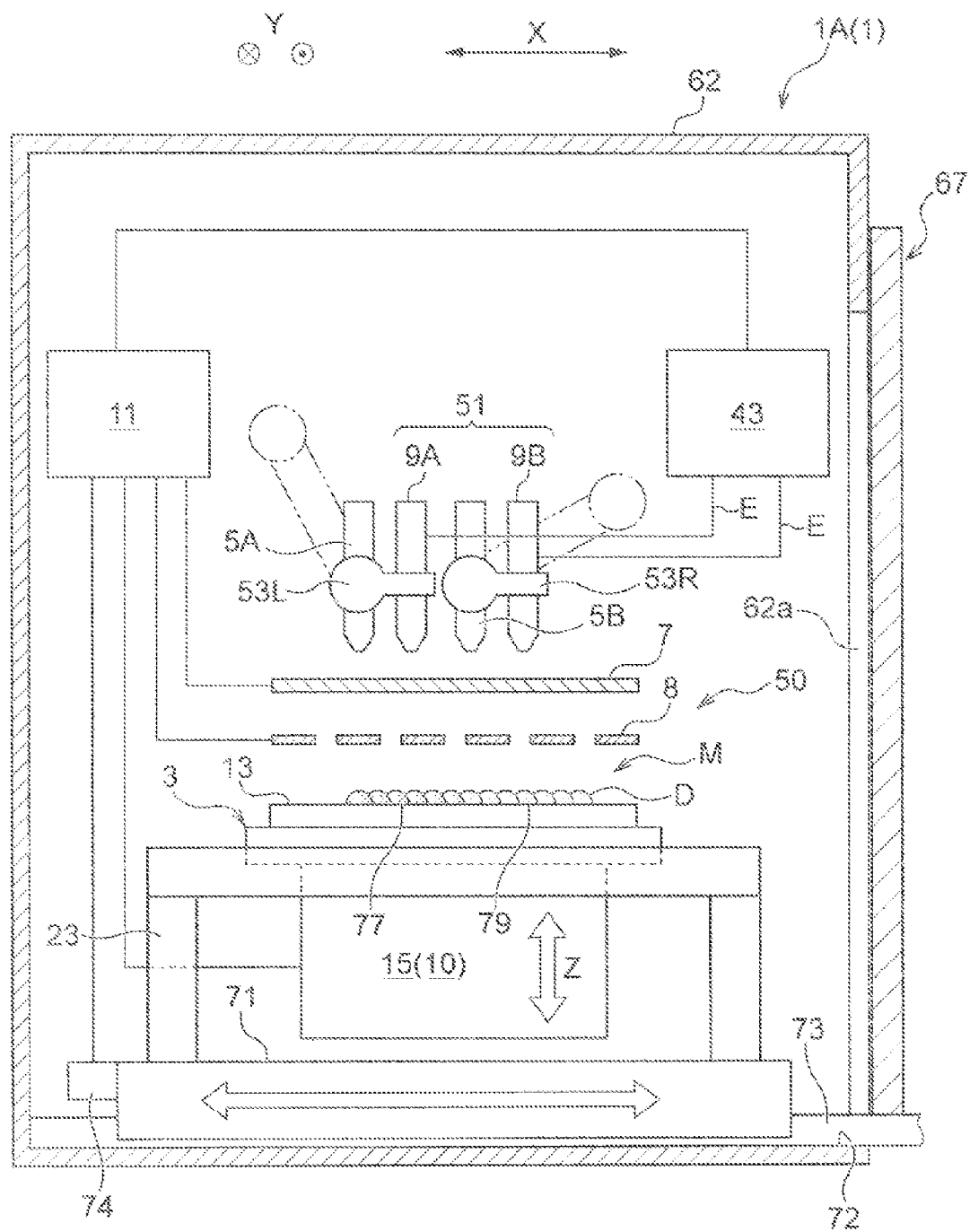
FIG. 4 is a front view showing inside of a second chamber of the manufacturing apparatus for three-dimensional structure according to Embodiment 1 of the invention.
Figure 5:
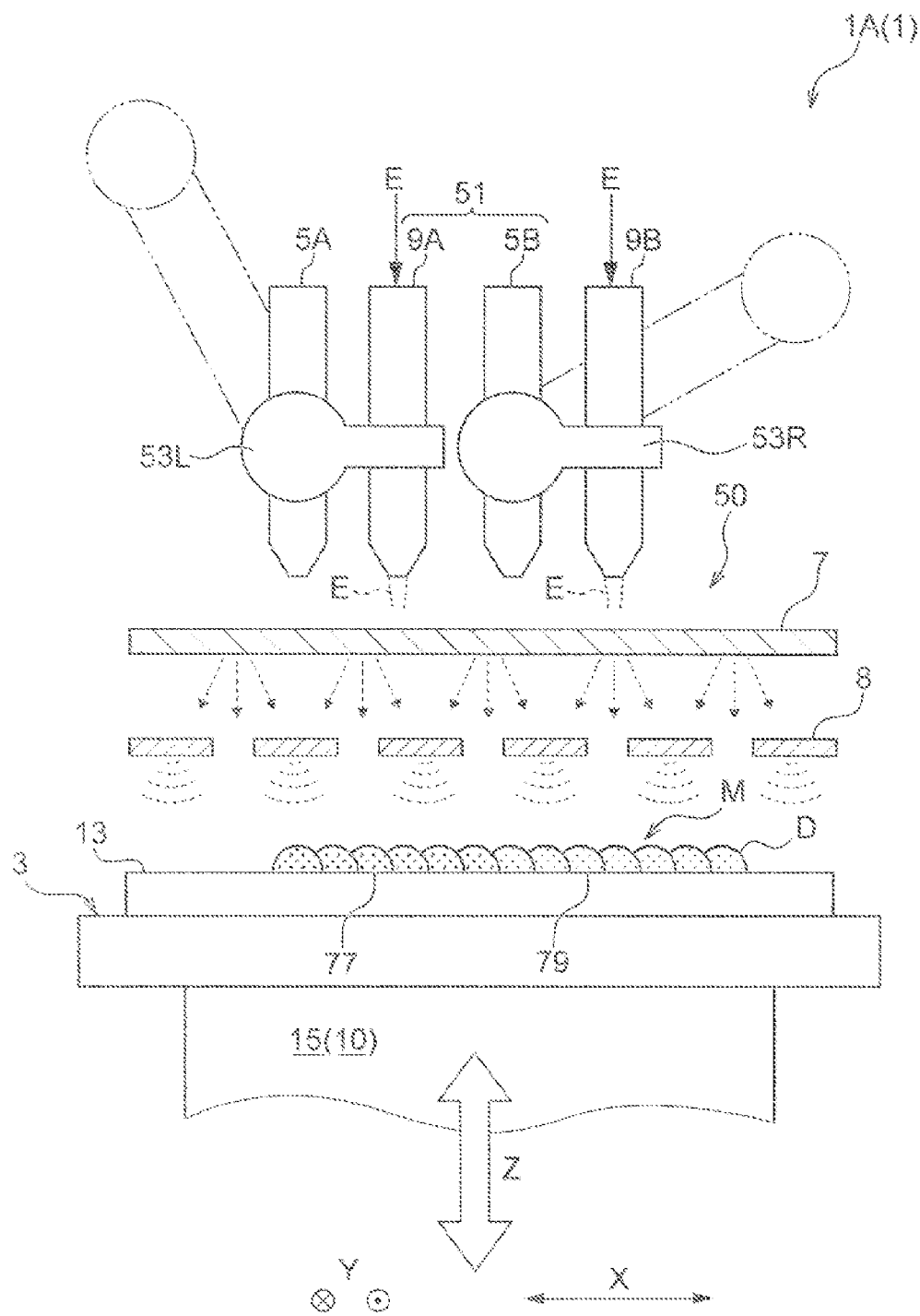
FIG. 5 is a front view showing a main part inside of the second chamber of the manufacturing apparatus for three-dimensional structure according to Embodiment 1 of the invention.

(1) Outline of Overall Configuration of Manufacturing Apparatus for Three-dimensional Structure (see FIG. 1)

Figure 6:
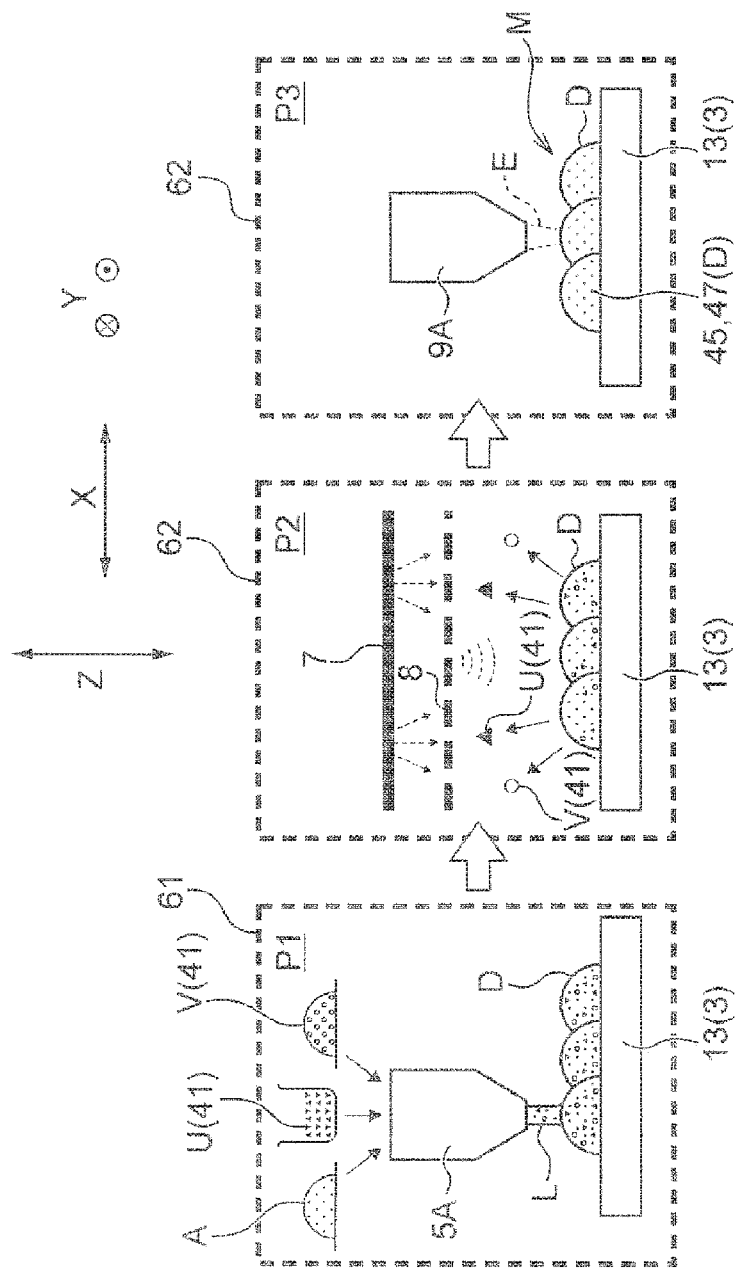
FIG. 6 is an explanatory diagram schematically showing a manufacturing method for three-dimensional structure according to Embodiment 2 of the invention.

As shown in the drawings, a manufacturing apparatus for three-dimensional structure 1A according to the embodiment is an apparatus of manufacturing a three-dimensional structure M by forming a unit layer D using a flowable composition L discharged onto a stage 3, removing organic materials 41 (FIG. 6) contained in the unit layer D, and then, applying energy E to the unit layer D to form a molten layer 45 or sintered layer 47 (FIG. 6). Note that, generally, the operation is repeated in a stacking layer direction Z at a predetermined number of times as appropriate, and thereby, a three-dimensional structure M having a stacking layer structure in which a plurality of layers D are stacked is manufactured.

As shown in FIG. 1, basically, the manufacturing apparatus for three-dimensional structure 1A according to the embodiment includes a layer forming unit 49 that forms the unit layer D using the flowable composition L containing powder A and the organic materials 41 (FIG. 6), an organic material removing unit 50 that performs a treatment of removing the organic materials 41 from the formed unit layer D, and an energy applying unit 51 that applies energy E to the unit layer D after the treatment of removing the organic materials 41 to form the molten layer 45 or sintered layer 47.

Further, in the embodiment, a first chamber 61 that houses the layer forming unit 49 and a second chamber 62 that houses the organic material removing unit 50 are provided. Furthermore, a reciprocating unit 65 that reciprocates the stage 3 between the first chamber 61 and the second chamber 62 together with a supporting frame 23 that supports the stage 3, and a shutter 67 provided between the first chamber 61 and the second chamber 62 are provided.

(2) Specific Configuration of Manufacturing Apparatus for Three-Dimensional Structure (see FIGS. 1 to 5)

The stage 3 is a member on which the flowable composition L is discharged, for example, and the unit layer D is formed, and a baseplate 13 having a flat plate shape as an example of a layer formation region is provided on the upper surface thereof. Further, the stage 3 is supported by the supporting frame 23 as described above, and adapted to reciprocate in predetermined strokes that allow coming and going between the first chamber 61 and the second chamber 62 by a reciprocating base 71 provided under the supporting frame 23.

The reciprocating base 71 is guided by a rail 73 provided on an installation surface 72 of the first chamber 61 and the second chamber 62 and subjected to a drive force generated by a third actuator 74, and reciprocates in the predetermined strokes along the rail 73. The above described reciprocating unit 65 includes the reciprocating base 71, the rail 73, and the third actuator 74.

Further, the shutter 67 is adapted to move in upward and downward directions as the stacking layer directions Z in the predetermined strokes that allow movement of the supporting frame 23 and the reciprocating base 71 integrated with the stage 3 between the first chamber 61 and the second chamber 62 by a fourth actuator 75 to open and close openings 61a, 62a between the chambers 61, 62.

Furthermore, the stage 3 is adapted to move in predetermined strokes necessary for formation of the three-dimensional structure M in the upward and downward directions as the stacking layer directions Z by an elevator drive part 15 as one of component members of a drive unit 10.

The layer forming unit 49 includes discharge heads 5 that discharge the flowable composition L onto the baseplate 13 as an example. To the discharge head 5, the flowable composition L is supplied from a raw material supply unit 17 via a supply tube 19, and the flowable composition L is discharged from a nozzle provided in the discharge head 5 to predetermined positions on the baseplate 13.

Further, in the embodiment, as another component member of the drive unit 10, a dual-arm articulated robot 55 including two robot arms 57, 59 is employed as an example, and the discharge heads 5 are supported by distal end portions of the robot arms 57, 59 with beam irradiation parts 9 (9A, 9B), which will be described later, and adapted to move in three-dimensional directions X, Y, Z including width directions X as leftward and rightward directions in the drawings, depth directions Y as frontward and backward directions in the drawings, and the stacking layer directions Z as the upward and downward directions in the drawings.

For example, the organic material removing unit 50 includes a heating part 7 provided in a fixed state as an example and an ultraviolet irradiation part 8 in a fixed state or adapted to move in the depth directions Y as an example within the second chamber 62.

Note that, as the heating part 7, a halogen heater, carbon heater, or the like that heats the unit layer D as an object to be heated by irradiation with infrared light may be employed as an example, and the ultraviolet irradiation part 8 is adapted to radiate one or a plurality of electromagnetic waves having various wavelengths including ultraviolet light.

The organic materials 41 that can be removed by the organic material removing unit 50 includes a solvent U and a binder V contained in the flowable composition L.

Here, as the flowable composition L containing the powder A as the raw material that can be used in the manufacturing apparatus for three-dimensional structure 1A according to the embodiment and the organic materials 41, a composition of the metal powder A, the solvent U, and the binder V may be applied as an example.

As the metal powder, granular or powdery particles of various metals, metal compounds, etc. may be used. Specifically, powder of various metals including aluminum, titanium, iron, copper, magnesium, stainless steel, and maraging steel, various metal oxides including silica, alumina, titanium oxide, zinc oxide, zircon oxide, tin oxide, magnesium oxide, and potassium titanate, various metal hydroxides including magnesium hydroxide, aluminum hydroxide, and calcium hydroxide, various metal nitrides including silicon nitride, titanium nitride, and aluminum nitride, various metal carbides including silicon carbide and titanium carbide, various metal sulfides including zinc sulfide, various metal carbonates including calcium carbonate and magnesium carbonate, various metal sulfates including calcium sulfate and magnesium sulfate, various metal silicates including calcium silicate and magnesium silicate, various metal phosphate including calcium phosphate, various metal borates including aluminum borate and magnesium borate, and composite compounds thereof, plasters (calcium sulfate hydrates, calcium sulfate anhydrides), etc. may be used.

The solvent or dispersion medium as an organic material includes e.g. alcohols such as methanol, ethanol, 2-propanol, 1-butanol, 2-butanol, octanol, ethylene glycol, diethylene glycol, and glycerin, ethers (cellosolves) such as ethylene glycol monomethyl ether (methyl cellosolve), esters such as methyl acetate, ethyl acetate, butyl acetate, and ethyl formate, ketones such as acetone, methyl ethyl ketone, diethyl ketone, methyl isobutyl ketone, methyl isopropyl ketone, and cyclohexanone, aliphatic hydrocarbons such as pentane, hexane, and octane, cyclic hydrocarbons such as cyclohexane and methyl cyclohexane, aromatic hydrocarbons having long-chain alkyl groups and benzene rings such as benzene, toluene, xylene, hexylbenzene, heptylbenzene, octylbenzene, nonylbenzene, decylbenzene, undecylbenzene, dodecylbenzene, tridecylbenzene, and tetradecylbenzene, halogenated hydrocarbons such as methylene chloride, chloroform, carbon tetrachloride, and 1,2-dichloroethane, aromatic heterocycles containing one of pyridine, pyrazine, furan, pyrrol, thiophene, and methylpyrrolidone, nitriles such as acetonitrile, propionitrile, and acrylonitrile, amides such as N,N-dimethylamide and N,N-dimethylacetamide, carboxylates, other various oils, etc.

The binder is not limited as long as it is soluble in the above described solvents or dispersion media. For example, acrylic resin, epoxy resin, silicone resin, cellulosic resin, synthetic resin, etc. may be used. Further, for example, a thermoplastic resin such as PLA (polylactic acid), PA (polyamide), or PPS (polyphenylene sulfide) may be used.

Or, the binder may be dispersed in the above described solvent or dispersion medium in a state of resin microparticles of the above described acrylic resin or the like, not in the soluble state.

The beam irradiation part 9 that irradiates the unit layer D from which the organic materials 41 have been removed with a laser beam as an example of the energy E may be applied to the energy applying unit 51 as an example, and is supplied with a laser in predetermined output oscillated from a laser oscillator 43 based on a control signal transmitted from a control unit 11, which will be described later, and irradiates the layer with the laser beam E.

Note that the laser used in the embodiment is not particularly limited, but a fiber laser or carbon dioxide laser having advantages that the wavelength is longer and the absorption efficiency of metal is higher may be used as a preferable laser.

In the illustrated embodiment, two sets of the beam irradiation parts 9 and the discharge heads 5 are provided. One set of beam irradiation part 9A and discharge head 5A are used for forming a first material layer 77 using a flowable composition L1 containing the powder A of metal or the like, and held by an invertible attachment base 53L provided on the robot arm 57 on the left side in the drawing as an example.

Further, the other set of beam irradiation part 9B and discharge head 5B are used for forming a supporting layer 79 using a flowable composition L2 containing powder B of ceramics or the like, and held by an invertible attachment base 53R provided on the robot arm 59 on the right side in the drawing as an example.

The first chamber 61 and the second chamber 62 are formed by housings having both air-tightness and pressure tightness that can endure the use in a reduced-pressure atmosphere as an example. The respective spaces within the chambers 61, 62 may be switched between being in communication or partitioned via the shutter 67.

In addition, in the manufacturing apparatus for three-dimensional structure 1A according to the embodiment, the drive unit 10 including the elevator drive part 15 and the robot 55 that move the relative positions of the above described two sets of the discharge head 5A and the beam irradiation part 9A and the discharge head 5B and the beam irradiation part 9B and the stage 3 in the three-dimensional directions X, Y, Z as an example, and the control unit 11 that controls various operations of the above described two sets of the discharge head 5A and the beam irradiation part 9A and the discharge head 5B and the beam irradiation part 9B, the drive unit 10, the reciprocating unit 65, and the shutter 67 are provided.

Figure 7:
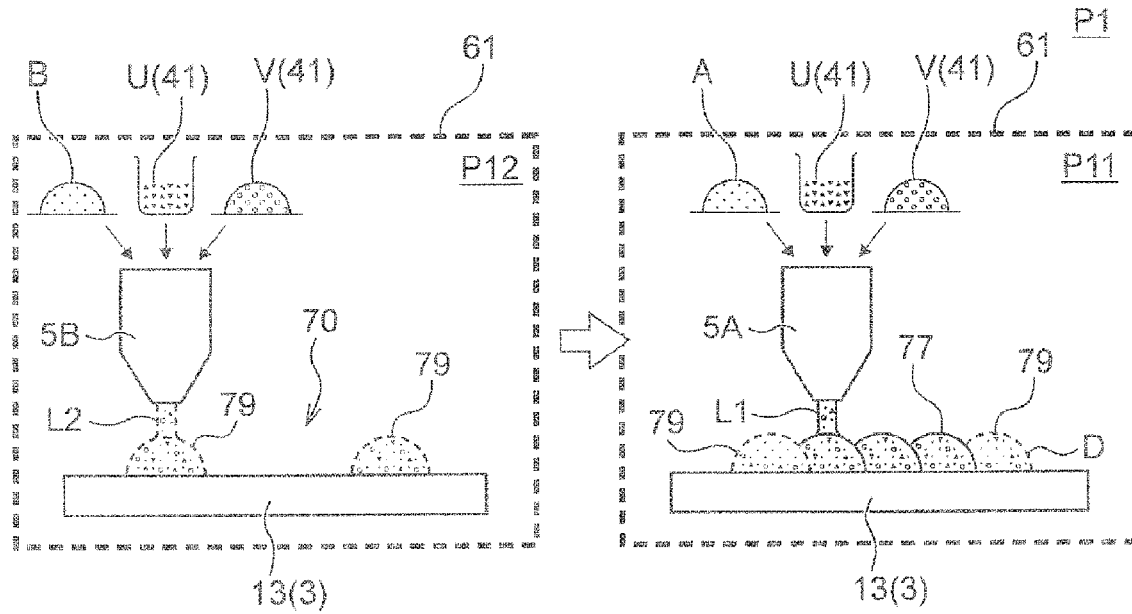
FIG. 7 is an explanatory diagram schematically showing another mode of a layer forming step in the manufacturing method for three-dimensional structure according to Embodiment 2 of the invention.

Embodiment 2 (see FIGS. 6 and 7)

A manufacturing method for three-dimensional structure according to Embodiment 2 is a manufacturing method executed using the above described manufacturing apparatus for three-dimensional structure 1A according to Embodiment 1.

Specifically, the manufacturing method for three-dimensional structure according to the embodiment basically includes a layer forming step P1, an organic material removing step P2, and an energy applying step P3. Further, in the embodiment, the layer forming step P1, the organic material removing step P2, and the energy applying step P3 are repeated in the stacking direction Z as appropriate, and thereby, both a planar three-dimensional structure M having only a single unit layer D and a steric three-dimensional structure M in which a plurality of unit layers D are stacked may be manufactured. As below, the details of these steps will be specifically explained with the manufacturing process of the three-dimensional structure M.

(1) Layer Forming Step

The layer forming step P1 is a step of supplying the flowable composition L containing the powder A and the organic materials 41 to form the unit layer D.

In other words, the third actuator 74 of the reciprocating unit 65 is driven as appropriate, the reciprocating base 71 is moved, and the stage 3 is positioned within the first chamber 61, and the fourth actuator 75 is driven, the shutter 67 is moved downward, and the opening 61a of the first chamber 61 is closed.

Then, the elevator drive part 15 is driven and the stage 3 is moved in the stacking direction Z so that the height of the stage 3 may be a formation height of the unit layer D to be first formed. Subsequently, the robot arm 57 is driven and the discharge head 5A is moved to an origin position in which the manufacture of the three-dimensional structure M is started.

Then, the attachment base 53L is inverted as appropriate and the discharge head 5A is positioned forward in a direction in which the attachment base 53L is moved from the origin position, and the flowable composition L is discharged from the discharge head 5A in a predetermined discharge amount and at a discharge time and a first discharged matter line is formed in the width direction X, for example.

It is preferable to raise the temperature of the baseplate 13 in advance prior to the formation of the discharged matter line. In this regard, when the temperature of the baseplate 13 is raised in advance, property changes such as reduction in fluidity or semi-solidification due to the flowable composition L discharged from the discharge head 5A in contact with the baseplate 13 at the lower temperature may be reduced.

Incidentally, to realize discharge of the flowable composition L in the good condition, it is preferable that the material contains 15 wt % or more of the solvent U and the binder V as the organic materials 41, and, to realize discharge of the flowable composition L in the more stable condition, it is desirable that the material contains 20 wt % or more of them.

The first discharged matter line is formed in the above described manner, and then, the discharge head 5A is moved at a predetermined pitch in the depth direction Y, for example. Further, the attachment base 53L is inverted as appropriate, and then, the flowable composition L is discharged from the discharge head 5A and a second discharged matter line is formed while the robot arm 57 is driven and the attachment base 53L is moved in the same direction as or the opposite direction to that when the first discharged matter line L is formed.

Subsequently, the same operation is repeated at a predetermined number of times as appropriate, and the unit layers D are sequentially formed in the stacking direction Z.

Further, as shown in FIG. 7, the layer forming step P1 may include two steps of a first material layer forming step P11 of forming the first material layer 77 as a part of the three-dimensional structure M eventually and a supporting layer forming step P12 of forming the supporting layer 79 that supports the first material layer 77.

In this case, for example, first, the robot arm 59 on the right side is driven, the flowable composition L2 containing the powder B is discharged from the discharge head 5B attached to the attachment base 53R on the distal end thereof, and the supporting layer 79 is formed on the baseplate 13. Then, the robot arm 57 on the left side is driven, the flowable composition L1 containing the powder A is discharged from the discharge head 5A attached to the attachment base 53L on the distal end thereof and fills an air gap portion 70 of the formed supporting layer 79, and thereby, the first material layer 77 is formed on the baseplate 13.

Note that a metal powder may be applied to the powder A contained in the flowable composition L1 forming the first material layer 77 as an example. The metal powder containing at least one of magnesium, iron, copper, cobalt, titanium, chromium, nickel, maraging steel, stainless, cobalt-chromium-molybdenum, titanium alloy, nickel alloy, aluminum alloy, cobalt alloy, and cobalt-chromium alloy may be applied to the powder.

A powder containing at least one of alumina and ceramics may be applied to the powder B contained in the flowable composition L2 forming the supporting layer 79.

(2) Organic Material Removing Step

The organic material removing step P2 is a step of performing a treatment of removing the organic materials 41 contained in the unit layer D with respect to the formed unit layer D.

In this case, the fourth actuator 75 is driven, the shutter 67 is moved upward, and the opening 61a of the first chamber 61 and the opening 62a of the second chamber 62 are opened. Then, the third actuator 74 of the reciprocating unit 65 is driven, the reciprocating base 71 is moved, and the stage 3 is positioned within the second chamber 62. Further, the fourth actuator 75 is driven again, the shutter 67 is moved downward, and the opening 61a of the first chamber 61 and the opening 62a of the second chamber 62 are closed to seal the second chamber 62.

Under the condition, the heating part 7 and the ultraviolet irradiation part 8 are activated to heat the unit layer D existing on the baseplate 13 to a predetermined temperature. Then, when the object to be heated here is the solvent U of the organic materials 41 contained in the flowable composition L, the solvent is heated and gasified by heating at the temperature from 70° C. to 300° C. determined by the kind of solvent.

It is preferable to select the solvent from solvents having boiling points from about 70° C. to 300° C. The solvent having the boiling point equal to or lower than 70° C. is not desirable because the flowable composition L is dried too easily and layer formation is difficult and the flowable composition L is solidified near the nozzles of the discharge head 5A and the nozzles are clogged. Further, as for the solvent having the boiling point higher than 300° C., energy necessary for gasification is excessive.

When the object to be heated is the binder V of the organic materials 41 contained in the flowable composition L, the binder V is decomposed by heating the binder at a temperature equal to or lower than 500° C. determined by the kind of binder V.

The energy that can remove the binder V is determined by the kind of binder V as described above, and it is preferable to use a binder that decomposes at a temperature equal to or lower than 500° C. in view of avoidance of excessive energy application. In this manner, the energy that can remove the binder is easily and specifically determined.

(3) Energy Applying Step

The energy applying step P3 is a step of applying energy E to the unit layer D after the organic material removing step P2 to form the molten layer 45 or sintered layer 47.

In this regard, in the embodiment, the powder A from which the organic materials 41 have been removed is irradiated with the high-power laser beam E from the beam irradiation part 9A and the powder A is molten or sintered to form the molten layer 45 or sintered layer 47. Then, on the first unit layer D as the molten layer 45 or sintered layer 47, the same unit layers D formed at the above described steps P1, P2, P3 are stacked as appropriate, and thereby, the three-dimensional structure M is manufactured.

According to the manufacturing apparatus for three-dimensional structure 1A according to Embodiment 1 and the manufacturing method for three-dimensional structure according to the embodiment executed by using the manufacturing apparatus for three-dimensional structure 1A, reduction in mechanical, physical, chemical characteristics and properties caused by reduction of purity of the three-dimensional structure M due to the residual organic materials 41 inside or on the surface of the manufactured three-dimensional structure M may be prevented and the characteristics and properties originally possessed by the manufactured three-dimensional structure M effectively emerge.

Figure 8:
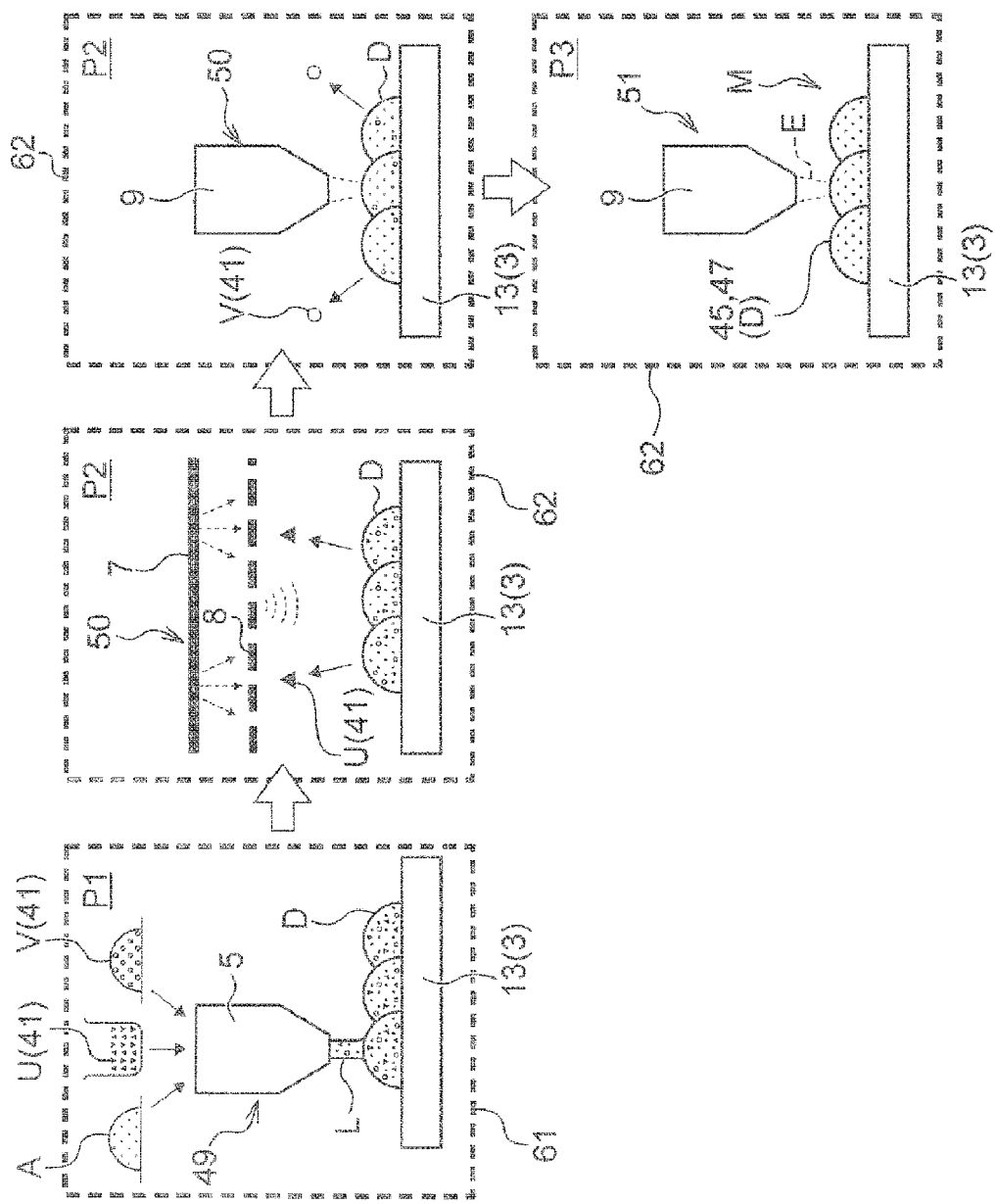
FIG. 8 is an explanatory diagram schematically showing a manufacturing method for three-dimensional structure according to Embodiment 3 of the invention.

Embodiment 3 (see FIG. 8)

A manufacturing method for three-dimensional structure according to Embodiment 3 is an embodiment using the beam irradiation part 9 used at the energy applying step P3 also as an organic material removing unit 50 that removes the binder V of the organic materials 41 contained in the flowable composition L.

Therefore, the details of the layer forming step P1 and the energy applying step P3 are the same as those of Embodiment 2 and their explanation is omitted here and the details of the organic material removing step P2 different from those of Embodiment 2 are explained.

In the embodiment, at the organic material removing step P2, the removal of the solvent U of the organic materials 41 contained in the flowable composition L is performed using the same heating part 7 and ultraviolet irradiation part 8 as those of Embodiment 2, and the removal of the binder V of the organic materials 41 contained in the flowable composition L is performed using the beam irradiation part 9A by adjustment of the output of the part to be used at the next energy applying step P3.

According to the manufacturing method for three-dimensional structure according to the embodiment, the same functions and effects as those of the above described manufacturing method for three-dimensional structure according to Embodiment 2 are exerted. Further, in the embodiment, both the solvent U having the lower boiling point and the binder V having the higher boiling point can be effectively removed.

Figure 9:
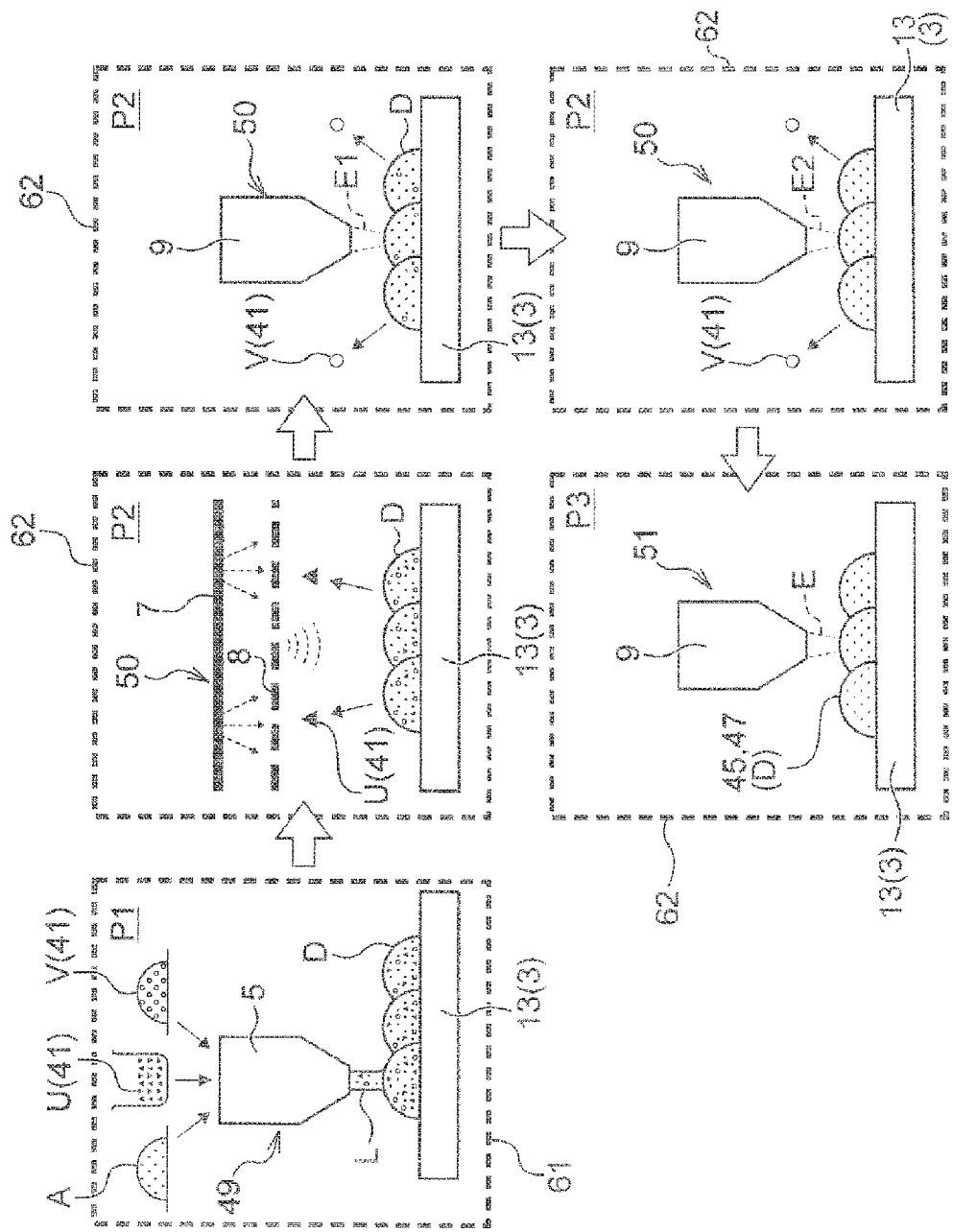
FIG. 9 is an explanatory diagram schematically showing a manufacturing method for three-dimensional structure according to Embodiment 4 of the invention.

Embodiment 4 (see FIG. 9)

A manufacturing method for three-dimensional structure according to Embodiment 4 is an embodiment in which the step of removing the binder V of the organic materials 41 is further divided into two steps at the organic material removing step P2 in Embodiment 3.

Therefore, the details of the layer forming step P1 and the energy applying step P3 are the same as those of Embodiment 2 and the basic details of the organic material removing step P2 are the same as those of Embodiment 3, and their explanation is omitted here and the details of the organic material removing step P2 different from those of Embodiment 3 are explained.

In the embodiment, the laser beam E for removing the binder V as the organic material 41 is applied at multiple stages at various output levels, and the output of the first applied laser beam E1 is set to be smaller at the lower level than that of the output of the subsequently applied laser beam E2.

According to the manufacturing method for three-dimensional structure according to the embodiment, the same functions and effects as those of the respective manufacturing methods for three-dimensional structure according to Embodiment 2, Embodiment 3 are exerted. Further, in the embodiment, the first applied energy E is at the lower level than that of the subsequently applied energy E, and thereby, the binder V may be removed gradually in a stepwise manner and the potential of the residual binder V may be reduced.

Figure 10:
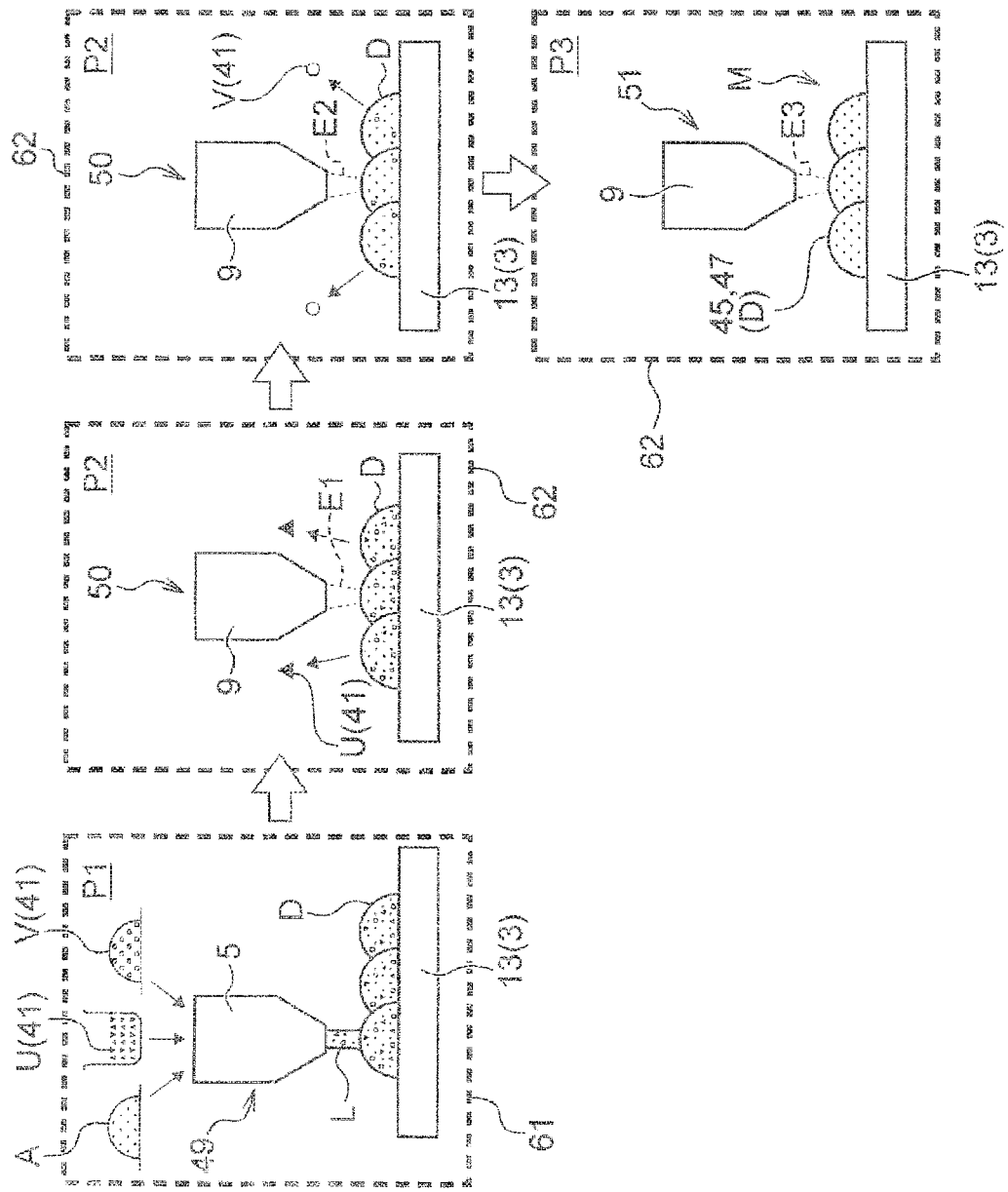
FIG. 10 is an explanatory diagram schematically showing a manufacturing method for three-dimensional structure according to Embodiment 5 of the invention.

Embodiment 5 (see FIG. 10)

A manufacturing method for three-dimensional structure according to Embodiment 5 is an embodiment in which the removal of the solvent U as the organic material 41 using the heating part 7 and the ultraviolet irradiation part 8 at the organic material removing step P2 of Embodiment 3 is performed using the same beam irradiation part 9A as that for the binder V.

Therefore, the details of the layer forming step P1 and the energy applying step P3 are the same as those of Embodiment 2 and the basic details of the organic material removing step P2 are the same as those of Embodiment 3, and their explanation is omitted here and the details of the organic material removing step P2 different from those of Embodiment 3 are explained.

In the embodiment, the same area of the unit layer D formed at the layer forming step P1 is irradiated with the laser beam E at least twice and the process moves from the removing treatment of the organic materials 41 to the forming treatment of the molten layer 45 or sintered layer 47 in a stepwise manner, and thereby, the organic material removing step P2 and the energy applying step P3 are executed.

Specifically, the output level of the laser beam E is divided into three stages of low level, medium level, high level, and the laser beam E1 at the low level is radiated toward a predetermined area of the unit layer D and used for removal of the solvent U existing in the predetermined area and the laser beam E2 at the medium level is radiated toward the same area of the unit layer D and used for removal of the binder U existing in the same area. Further, the laser beam E3 at the high level is radiated toward the same area of the unit layer D, and thereby, can be used for melting or sintering the powder A existing in the same area to form the molten layer 45 or sintered layer 47.

According to the manufacturing method for three-dimensional structure according to the embodiment, the same functions and effects as those of the respective manufacturing methods for three-dimensional structure according to Embodiment 2, Embodiment 3 are exerted. Further, in the embodiment, the organic material removing step P2 and the energy applying step P3 can be continuously performed by changing the output of the laser beam E using the same beam irradiation part 9, and thereby, the more efficient manufacture of the three-dimensional structure M can be performed.

Figure 11:
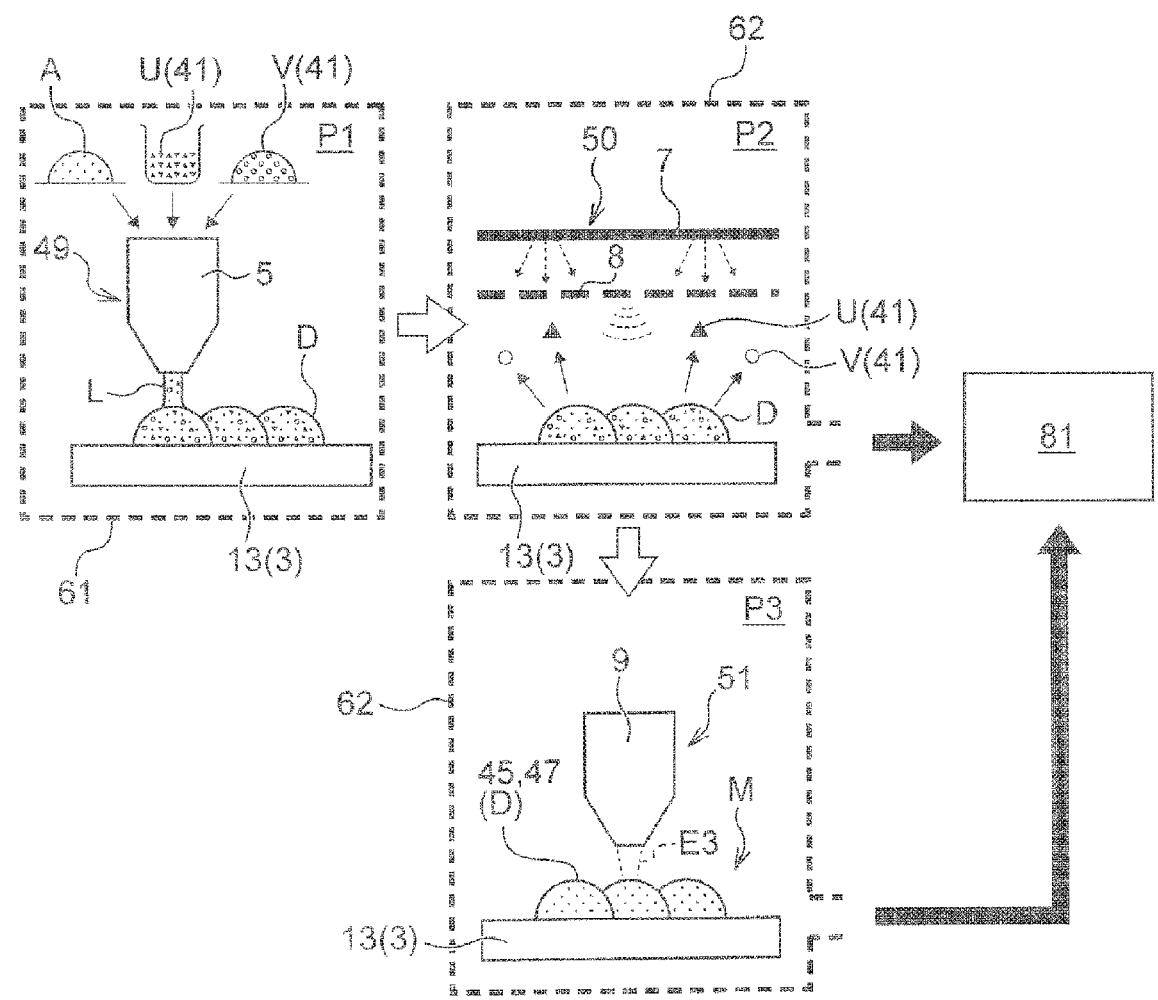
FIG. 11 is an explanatory diagram schematically showing a manufacturing method for three-dimensional structure according to Embodiment 6 of the invention.

Embodiment 6 (see FIG. 11)

A manufacturing method for three-dimensional structure according to Embodiment 6 is an embodiment in which at least one step of the organic material removing step P2 and the energy applying step P3 is performed under a reduced-pressure atmosphere.

Therefore, the details of the layer forming step P1 and the basic details of the organic material removing step P2 and the energy applying step P3 are the same as those of Embodiment 2, and their explanation is omitted here and the differences of the organic material removing step P2 and the energy applying step P3 different from those of Embodiment 2 are explained.

In the embodiment, both the organic material removing step P2 and the energy applying step P3 are performed under the reduced-pressure atmosphere. Specifically, in the embodiment, a decompression device 81 is connected to the second chamber 62 and the decompression device 81 is driven to set the atmosphere within the second chamber 62 to the reduced-pressure atmosphere, and then, the organic material removing step P2 and the energy applying step P3 are executed.

According to the manufacturing method for three-dimensional structure according to the embodiment, the same functions and effects as those of the above described manufacturing method for three-dimensional structure according to Embodiment 2 are exerted. Further, in the embodiment, the organic materials 41 can be dried and gasified for removal at the lower heating temperature, and thereby, the removal of the organic materials 41 in the unit layer D is easier.

Figure 12:
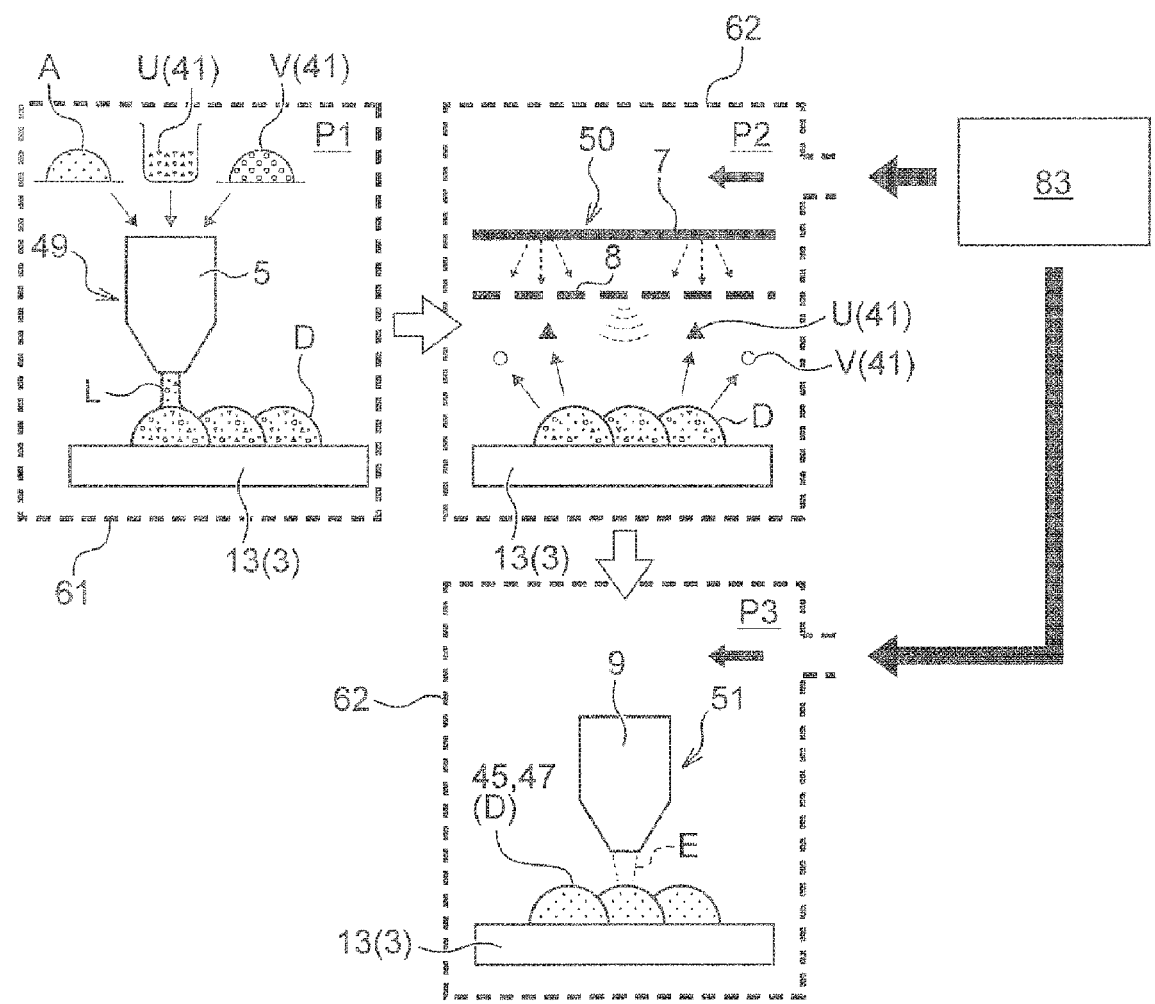
FIG. 12 is an explanatory diagram schematically showing a manufacturing method for three-dimensional structure according to Embodiment 7 of the invention.

Embodiment 7 (see FIG. 12)

A manufacturing method for three-dimensional structure according to Embodiment 7 is an embodiment in which at least one step of the organic material removing step P2 and the energy applying step P3 is performed under an inert gas atmosphere.

Therefore, the details of the layer forming step P1 and the basic details of the organic material removing step P2 and the energy applying step P3 are the same as those of Embodiment 2, and their explanation is omitted here and the differences of the organic material removing step P2 and the energy applying step P3 different from those of Embodiment 2 are explained.

In the embodiment, both the organic material removing step P2 and the energy applying step P3 are performed under the inert gas atmosphere. Specifically, in the embodiment, an inert gas filling device 83 is connected to the second chamber 62 and the inert gas filling device 83 is driven to fill the second chamber 62 with an inert gas and set the atmosphere within the second chamber 62 to the inert gas atmosphere, and then, the organic material removing step P2 and the energy applying step P3 are performed.

According to the manufacturing method for three-dimensional structure according to the embodiment, the same functions and effects as those of the above described manufacturing method for three-dimensional structure according to Embodiment 2 are exerted. Further, in the embodiment, the potential that the powder A is oxidized and the organic components of oxygen etc. are incorporated into the three-dimensional structure M can be reduced.

Figure 13:
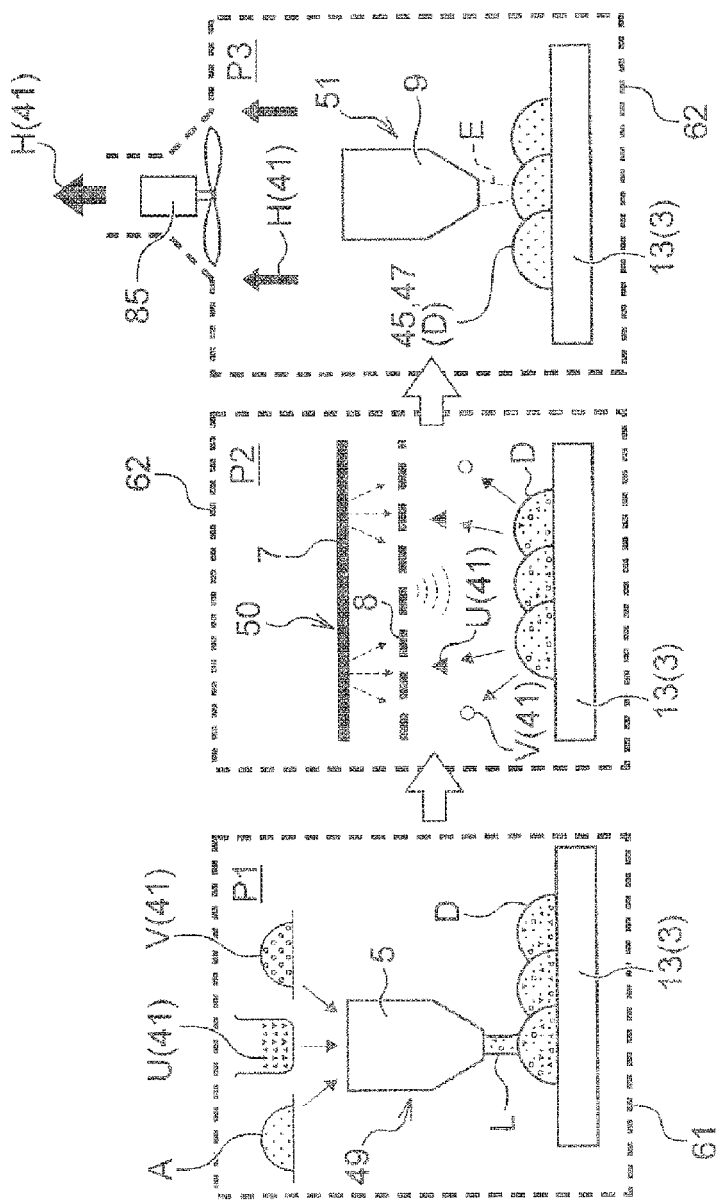
FIG. 13 is an explanatory diagram schematically showing a manufacturing method for three-dimensional structure according to Embodiment 8 of the invention.

Embodiment 8 (see FIG. 13)

A manufacturing method for three-dimensional structure according to Embodiment 8 is an embodiment in which fume H generated at the energy applying step P3 is suctioned for removal.

Therefore, the details of the layer forming step P1 and the organic material removing step P2 and the basic details of the energy applying step P3 are the same as those of Embodiment 2, and their explanation is omitted here and the differences of the energy applying step P3 different from that of Embodiment 2 are explained.

In the embodiment, the fume H generated by irradiation of the unit layer D from which the organic materials 41 have been removed with the high-level output laser beam E is exhausted to the outside on suction wind generated by a suction device 85 provided for the second chamber 62, and then, the energy applying step P3 is executed.

According to the manufacturing method for three-dimensional structure according to the embodiment, the same functions and effects as those of the above described manufacturing method for three-dimensional structure according to Embodiment 2 are exerted. Further, in the embodiment, the potential that the organic materials 41 of carbon or the like contained in the fume H attach to the surface of the three-dimensional structure M and are incorporated into the three-dimensional structure M may be reduced.

Figure 14:
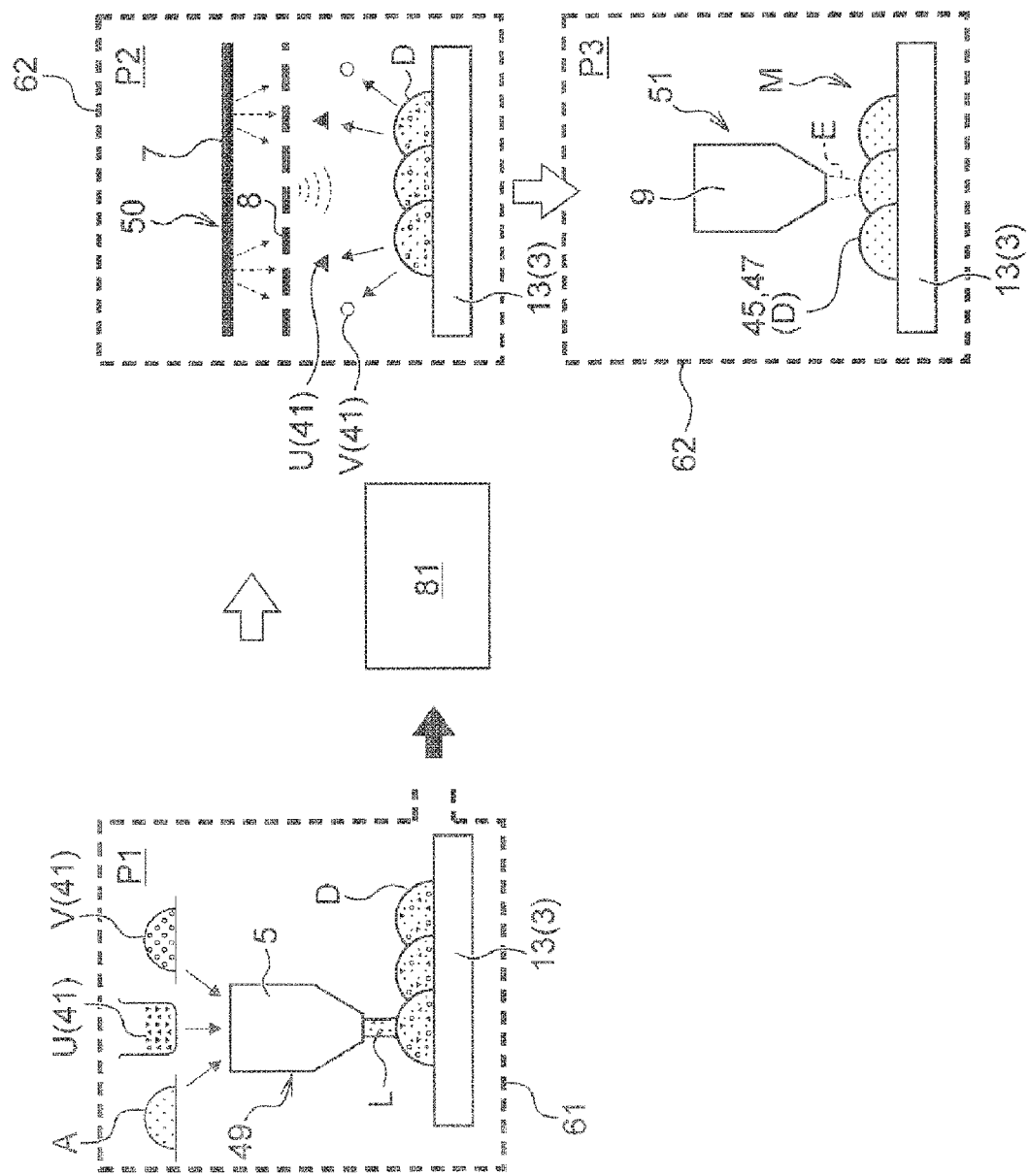
FIG. 14 is an explanatory diagram schematically showing a manufacturing method for three-dimensional structure according to Embodiment 9 of the invention.

Embodiment 9 (see FIG. 14)

A manufacturing method for three-dimensional structure according to Embodiment 9 is an embodiment in which the layer forming step P1 is performed under a reduced-pressure atmosphere.

Therefore, the details of the organic material removing step P2 and the details of the energy applying step P3 and the basic details of the layer forming step P1 are the same as those of Embodiment 2, and their explanation is omitted here and the differences of the layer forming step P1 different from that of Embodiment 2 are explained.

In the embodiment, the layer forming step P1 is performed under the reduced-pressure atmosphere. Accordingly, the first chamber 61 of the manufacturing apparatus for three-dimensional structure 1 used in the embodiment is required to have both air-tightness and pressure tightness that can endure the use under reduced-pressure atmosphere. Further, a decompression device 81 is connected to the first chamber 61 and the decompression device 81 is driven to set the atmosphere within the first chamber 61 to the reduced-pressure atmosphere, and then, the layer forming step P1 is performed.

According to the manufacturing method for three-dimensional structure according to the embodiment, the same functions and effects as those of the above described manufacturing method for three-dimensional structure according to Embodiment 2 are exerted. Further, in the embodiment, the organic materials 41 can be dried and gasified for removal at the lower temperature even in the formation of the unit layer D.

Figure 15:
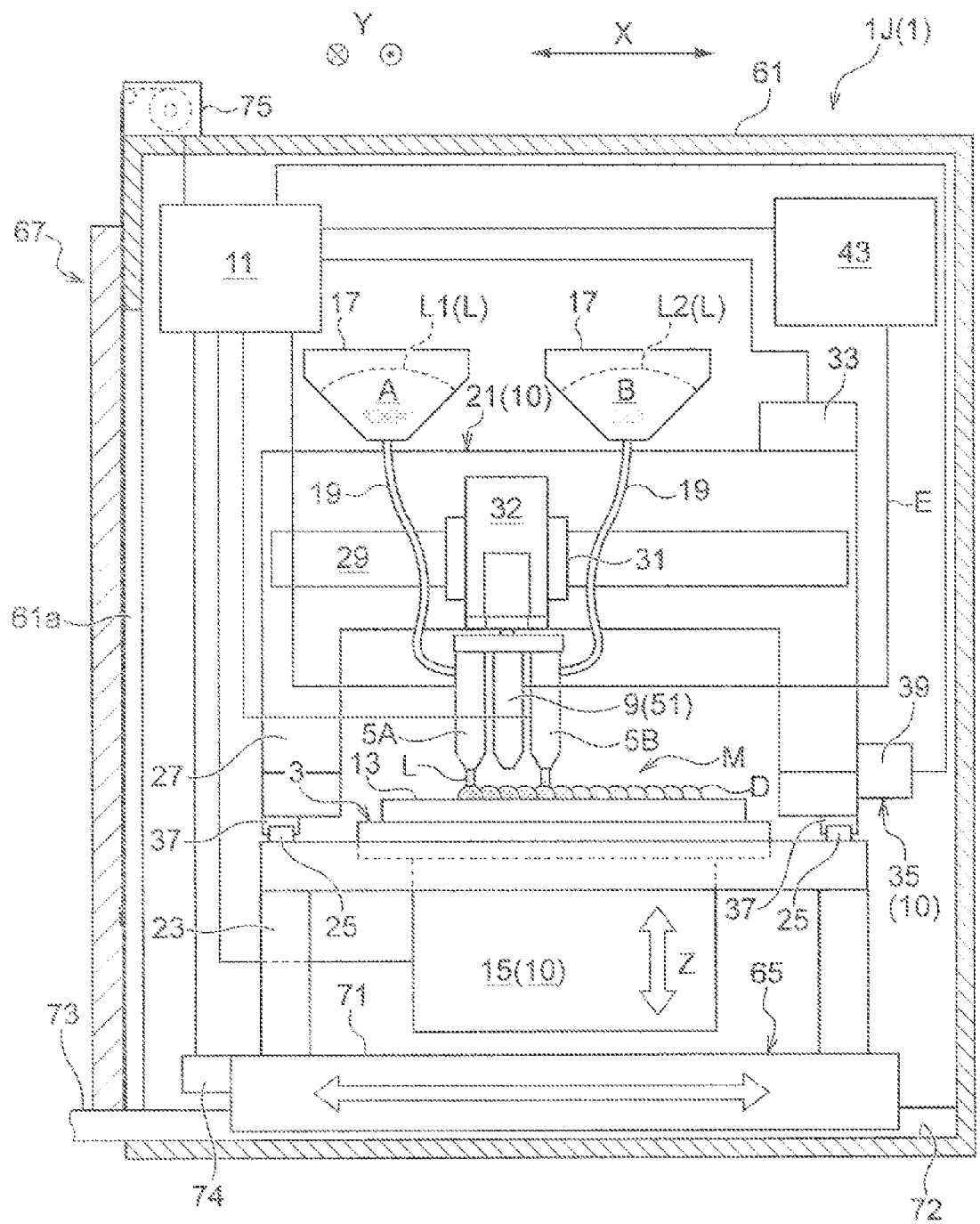
FIG. 15 is a front view showing inside of a first chamber of a manufacturing apparatus for three-dimensional structure according to Embodiment 10 of the invention.

Embodiment 10 (see FIG. 15)

A manufacturing apparatus for three-dimensional structure 1J according to Embodiment 10 is an embodiment in which a first drive device 21 that serves to movement in the width directions X and a second drive device 35 that serves movement in the depth directions Y in place of the robot 55 as the component member of the drive unit 10 of the manufacturing apparatus for three-dimensional structure 1A according to Embodiment 1.

Therefore, the other configurations than those of the first drive device 21 and the second drive device 35 are the same as those of Embodiment 1 and their explanation here is omitted, and the configurations of the first drive device 21 and the second drive device 35 different from those of Embodiment 1 and the summary of the operation modes are explained.

In the embodiment, two discharge heads 5A, 5B and one beam irradiation part 9 are attached to a carriage 32 at a variable rotation angle, and the carriage 32 is adapted to move in predetermined strokes necessary for the formation of the three-dimensional structure M in the width directions X by the first drive device 21.

Note that, in the illustrated embodiment, as the first drive device 21, a configuration including a traveling frame 27 traveling on two second guide rails 25 extending in the depth directions Y provided on the supporting frame 23, a first guide rail 29 provided to extend in the width directions X with respect to the traveling frame 27, a first sliding block 31 reciprocating in the width directions X along the first guide rail 29, and a first actuator 33 that applies a drive force to the first sliding block 31 is employed as an example.

Further, the traveling frame 27 is adapted to move in predetermined strokes necessary for the formation of the three-dimensional structure M in the depth directions Y as frontward and rearward directions as an example by the second drive device 35 as the component member of the drive unit 10.

Note that, in the illustrated embodiment, as the second drive device 35, a configuration including the above described two second guide rails 25 provided on the supporting frame 23, second sliding blocks 37 provided on the traveling frame 27 reciprocating in the depth directions Y along the second guide rails 25, and a second actuator 39 that applies a drive force to the second sliding blocks 37 is employed as an example.

According to the manufacturing apparatus for three-dimensional structure 1J according to the embodiment, the same functions and effects as those of the manufacturing apparatus for three-dimensional structure 1A according to Embodiment 1 are exerted. Further, in the embodiment, generally, the carriage 32 is movable in a wider range than that of the configuration using the robot arms 57, 59 of Embodiment 1, and thereby, the three-dimensional structure M in the larger size can be manufactured.

Other Embodiments

The manufacturing method for three-dimensional structure and the manufacturing apparatus therefor 1 according to the invention basically have the above described configurations, however, obviously, partial changes, omissions, etc. can be made to the configurations without departing from the scope of the invention.

Figure 16:
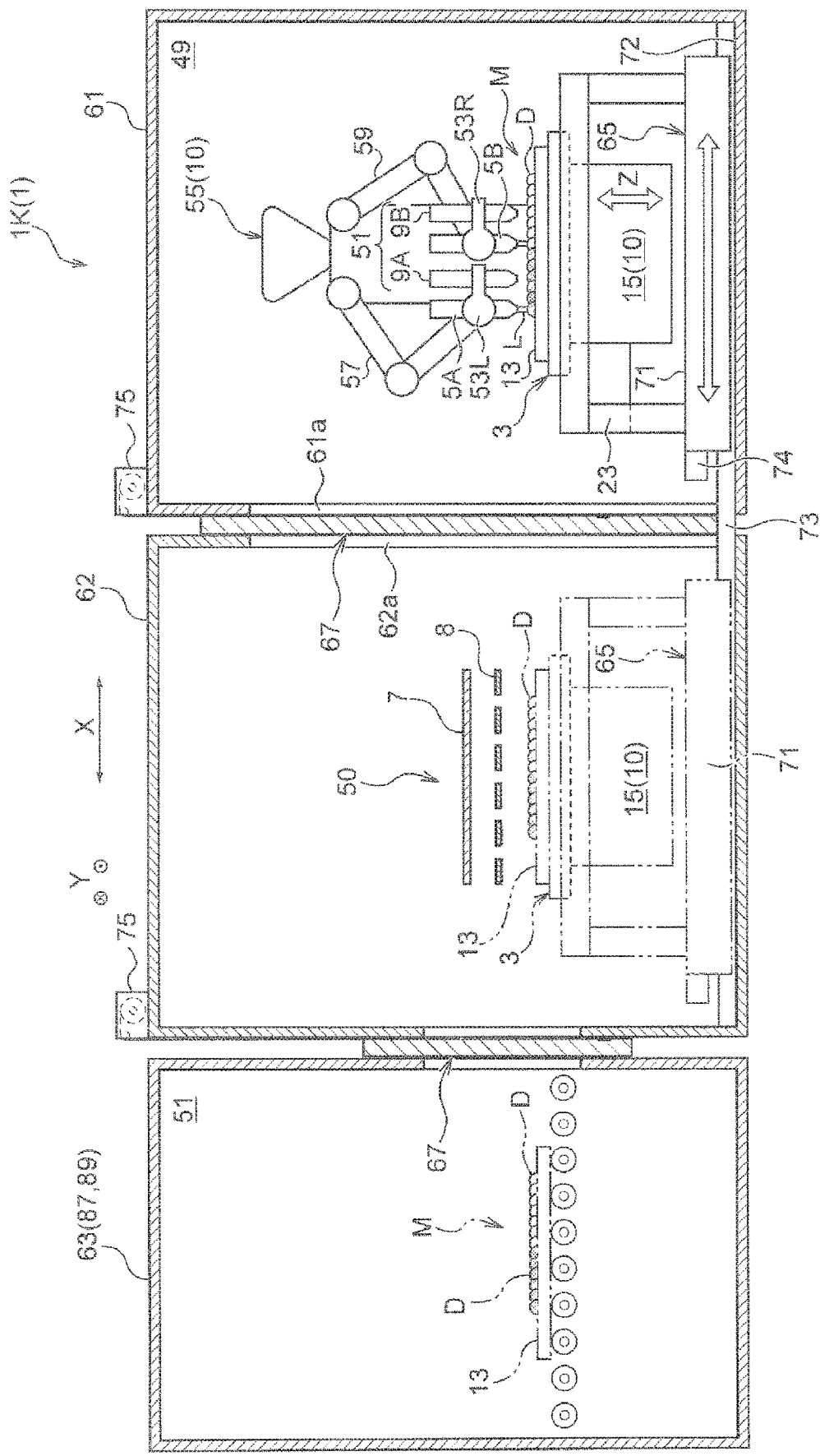
FIG. 16 is a front view schematically showing an overall configuration of a manufacturing apparatus for three-dimensional structure according to another embodiment of the invention.

For example, as shown in FIG. 16, a manufacturing apparatus for three-dimensional structure 1K having a configuration including a third chamber 63 for melting or sintering the powder A in the unit layer D from which the organic materials 41 have been removed in addition to the first chamber 61 for formation of the unit layer D and the second chamber 62 for removal of the organic materials 41 can be employed.

In this case, the third chamber 63 itself can be adapted to function as a melting furnace 87 or sintering furnace 89. Further, in the illustrated embodiment, another shutter 67 is provided between the second chamber 62 and the third chamber 63, and, regarding the movement between the second chamber 62 and the third chamber 63, only the baseplate 13 and the three-dimensional structure M provided on the stage are adapted to move.

The flowable compositions L1, L2 containing the powder A or powder B and the organic materials 41 are not limited to the configurations using one or two kinds of compositions as described in the respective embodiments, but configurations using three or more kinds of compositions may be employed. Further, a method for three-dimensional structure having the organic material removing step P2 executed in a state in which the second chamber 62 is filled with an inert gas under a reduced-pressure atmosphere by a combination of the configurations respectively provided in Embodiment 6 and Embodiment 7 may be employed.

What is claimed is:

1. A method for manufacturing a three-dimensional structure, the method comprising:
   a layer forming step of supplying a flowable composition containing a powder and an organic material to form a unit layer;
   an organic material removing step of performing a treatment to remove the organic material from the flowable composition forming the unit layer, the organic material removing step comprising using a first heating source to heat the unit layer to a first temperature at which the organic material is evaporated;
   wherein the layer forming step is performed in a first chamber, and the organic material removing step is performed in a second chamber that is different from the first chamber.

2. The method according to claim 1, further comprising;
   an energy applying step of applying energy to the powder in unit layer after the organic material removing step to form a molten layer or sintered layer, the energy applying step comprising using a second heating source to heat the unit layer to a second temperature that is above the sintering or melting temperature of the powder.

3. The method according to claim 1, wherein the organic material in the flowable composition is a solvent, and
   the organic material removing step has a step of gasifying the solvent for removal.

4. The method according to claim 1, wherein the organic material in the flowable composition contains a binder, and
   the organic material removing step has a step of applying energy that can remove the binder.

5. The method according to claim 4, wherein the energy that can remove the binder is applied at multiple stages, and a first applied energy is at a lower level than that of a subsequently applied energy.

6. The method according to claim 2, wherein the organic material removing step and the energy applying step are executed by irradiating the same area of the unit layer with a laser beam at least twice and moving from a removing treatment of the organic material to a forming treatment of the molten layer or sintered layer in a stepwise manner.

7. The method according to claim 2, wherein at least one of the organic material removing step and the energy applying step is performed under a reduced-pressure atmosphere.

8. The method according to claim 2, wherein at least one of the organic material removing step and the energy applying step is performed under an inert gas atmosphere.

9. The method according to claim 2, wherein fume generated at the energy applying step is suctioned.

10. The method according to claim 1, wherein the layer forming step is performed under a reduced-pressure atmosphere.

11. The method according to claim 1, wherein the layer forming step includes:
    a first material layer forming step of forming a first material layer corresponding to a three-dimensional structure; and
    a supporting layer forming step of forming a supporting layer that supports the first material layer.

12. The method according to claim 11, wherein the first material layer includes at least one of magnesium, iron, copper, cobalt, titanium, chromium, nickel, maraging steel, stainless, cobalt-chromium-molybdenum, titanium alloy, nickel alloy, aluminum alloy, cobalt alloy, and cobalt-chromium alloy as powder.

13. The method according to claim 11, wherein the supporting layer includes at least one of alumina and ceramics as powder.

14. An apparatus for manufacturing a three-dimensional structure, the apparatus comprising:
    a layer forming unit that supplies a flowable composition containing a powder and an organic material to form a unit layer;
    an organic material removing unit, having a first heating source that performs a treatment to remove the organic material from the flowable composition forming the unit layer, the first heating source being configured to heat the unit layer to a first temperature at which the organic material is evaporated;
    wherein the layer forming unit is disposed in a first chamber, and the organic material removing unit is disposed in a second chamber that is different from the first chamber.

15. The apparatus according to claim 14, further comprising:
    a first chamber that houses the layer forming unit; and
    a second chamber that houses the organic material removing unit.

16. The method of claim 1, wherein the first chamber and the second chamber are separated by a shutter that can be opened and closed.

17. The apparatus of claim 14, wherein the first chamber and the second chamber are separated by a shutter that can be opened and closed.

* * * * *